United States Patent
Nakao et al.

(10) Patent No.: US 9,504,063 B2
(45) Date of Patent: *Nov. 22, 2016

(54) BASE STATION AND RELATED RADIO COMMUNICATION METHOD

(71) Applicant: Sun Patent Trust, New York, NY (US)

(72) Inventors: Seigo Nakao, Singapore (SG); Akihiko Nishio, Osaka (JP); Ayako Horiuchi, Kanagawa (JP); Daichi Imamura, Beijing (CN)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/040,855

(22) Filed: Feb. 10, 2016

(65) Prior Publication Data

US 2016/0165632 A1    Jun. 9, 2016

Related U.S. Application Data

(63) Continuation of application No. 14/619,615, filed on Feb. 11, 2015, now Pat. No. 9,295,078, which is a continuation of application No. 14/169,057, filed on Jan. 30, 2014, now Pat. No. 8,982,690, which is a continuation of application No. 13/498,287, filed as application No. PCT/JP2010/004881 on Aug. 3, 2010, now Pat. No. 8,681,602.

(30) Foreign Application Priority Data

Oct. 2, 2009   (JP) ................................ 2009-230727

(51) Int. Cl.
   *H04W 72/12*   (2009.01)
   *H04L 1/18*    (2006.01)
   (Continued)

(52) U.S. Cl.
   CPC ........ *H04W 72/1284* (2013.01); *H04L 1/1671* (2013.01); *H04L 1/1854* (2013.01);
   (Continued)

(58) Field of Classification Search
   CPC ............................. H04W 72/04; H04W 28/04
   See application file for complete search history.

(56) References Cited

U.S. PATENT DOCUMENTS 7,848,385 B2   12/2010  Nakao et al.
7,933,309 B2    4/2011  Nakao et al.
(Continued)

FOREIGN PATENT DOCUMENTS

CN    101133560 A    2/2008
EP    2 077 677 A1   7/2009
(Continued)

OTHER PUBLICATIONS

3GPP TS 36.211 V8/.0, "3rd Generation Partnership Project; Technical Specification Group Radio Access Network; Evolved Universal Terrestrial Radio Access (E-UTRA); Physical Channels and Modulation (Release 8)," May 2009, 83 pages.
(Continued)

*Primary Examiner* — Dang Ton
*Assistant Examiner* — Nourali Mansoury
(74) *Attorney, Agent, or Firm* — Seed Intellectual Property Law Group PLLC

(57) ABSTRACT

Provided are a terminal device and a retransmission control method that make it possible to minimize increases in overhead in an uplink control channel (PUCCH), even if channel selection is used as the method to transmit response signals during carrier-aggregation communication using a plurality of downlink unit bands. On the basis of the generation status of uplink data and error-detection results obtained by a CRC unit, a control unit in the provided terminal uses response signal transmission rules to control the transmission of response signals or uplink control signals that indicate the generation of uplink data. If an uplink control signal and a response signal are generated simultaneously within the same transmission time unit, the control unit changes the resources allocated to the response signal and/or the phase point of the response signal in accordance with the number and position of ACKs within the error-detection result pattern.

30 Claims, 17 Drawing Sheets

(51) Int. Cl.
*H04W 52/02* (2009.01)
*H04L 1/16* (2006.01)
*H04W 76/04* (2009.01)
*H04L 1/00* (2006.01)
*H04W 28/04* (2009.01)
*H04W 72/04* (2009.01)

(52) U.S. Cl.
CPC ..... *H04W52/0212* (2013.01); *H04W 72/0413* (2013.01); *H04W 72/1278* (2013.01); *H04W 76/048* (2013.01); *H04L 1/0061* (2013.01); *H04W 28/04* (2013.01); *H04W 72/04* (2013.01)

(56) References Cited

U.S. PATENT DOCUMENTS

| | | |
|---|---|---|
| 8,238,403 B2 | 8/2012 | Nakao et al. |
| 8,289,866 B2 | 10/2012 | Sambhwani et al. |
| 8,351,370 B2 | 1/2013 | Kim et al. |
| 8,422,533 B2 | 4/2013 | Nakao et al. |
| 8,630,330 B2 | 1/2014 | Nakao et al. |
| 8,879,603 B2 | 11/2014 | Nakao et al. |
| 2006/0183431 A1 | 8/2006 | Chang et al. |
| 2009/0042558 A1 | 2/2009 | Shen et al. |
| 2009/0196247 A1 | 8/2009 | Fan et al. |
| 2009/0316811 A1 | 12/2009 | Maeda et al. |
| 2010/0135359 A1 | 6/2010 | Nakao et al. |
| 2010/0311458 A1 | 12/2010 | Nakao et al. |
| 2011/0158290 A1 | 6/2011 | Nakao et al. |
| 2011/0211510 A1 | 9/2011 | Kim et al. |
| 2011/0216713 A1 | 9/2011 | Kim et al. |
| 2012/0140687 A1 | 6/2012 | Nakao et al. |
| 2012/0147980 A1 | 6/2012 | Nakao et al. |
| 2013/0195146 A1 | 8/2013 | Nakao et al. |
| 2014/0098767 A1 | 4/2014 | Nakao et al. |
| 2015/0016566 A1 | 1/2015 | Nakao et al. |

FOREIGN PATENT DOCUMENTS

| | | |
|---|---|---|
| WO | 2009/022866 A1 | 2/2009 |
| WO | 2009/044367 A2 | 4/2009 |
| WO | 2009/057285 A1 | 5/2009 |
| WO | 2009/098219 A2 | 8/2009 |

OTHER PUBLICATIONS

3GPP TS 36.212 V8/.0, "3rd Generation Partnership Project; Technical Specification Group Radio Access Network; Evolved Universal Terrestrial Radio Access (E-UTRA); Multiplexing and channel coding (Release 8)," May 2009, 60 pages.
3GPP TS 36.213 V8.7.0, "3rd Generation Partnership Project; Technical Specification Group Radio Access Network; Evolved Universal Terrestrial Radio Access (E-UTRA); Physical layer procedures (Release 8)," May 2009, 77 pages.
CATT, "Dynamic ACK/NACK Resource Reservation of PUCCH in LTE-A," R1-094545, 3GPP TSG RAN WG1 #59, Jeju, Korea, Nov. 9 -13, 2009, 3 pages.
English Translation of Chinese Search Report, dated Jan. 26, 2014, for corresponding Chinese Patent Application No. 201080044638.5, 2 pages.
Extended European Search Report dated Jun. 30, 2015, for corresponding EP Application No. 10820049.4-1860/2485526, 8 pages.
Huawei, "PUCCH design for carrier aggregation," R1-093046, 3GPP TSG RAN WG1 Meeting #58, Shenzhen, China, Aug. 24-28, 2009, 8 pages.
International Search Report, dated Sep. 14, 2010, for corresponding PCT/JP2010/004881, 1 page.
Invitation to Respond to Written Opinion, dated Jul. 29, 2013, for corresponding Singapore Application No. 201201923-8, 20 pages.
Nakao et al., "Performance enhancement of E-UTRA uplink control channel in fast fading environments," IEEE 69th Vehicular Technology Conference, VTC Spring, Apr. 26-29, 2009, 5 pages.
Nokia Siemens Networks, Nokia, "Simultaneous transmission of ACK/NACK and SR," R1-080932, Agenda Item: 6.1.4, 3GPP TSG RAN WG1 Meeting #52, Sorrento, Italy, Feb. 11-15, 2008, 5 pages.
Nokia Siemens Networks, Nokia, "DTX detection in case of simultaneous transmission of SR and ACK/NACK," R1-080933, Agenda Item: 6.1.4, 3GPP TSG RAN WG1 Meeting #52, Sorrento, Italy, Feb. 11-15, 2008, 8 pages.
Nokia Siemens Networks, Nokia, "UL control signalling for carrier aggregation," R1-092572, Agenda Item: 15.4, 3GPP TSG RAN WG1 Meeting #57bis, Los Angeles, CA, USA, Jun. 29-Jul. 3, 2009, 4 pages.
Panasonic, "UL ACK/NACK transmission on PUCCH for carrier aggregation," R1-092535, 3GPP TSG RAN WG1 #57bis, Los Angeles, USA, Jun. 29,-Jul. 3, 2009, 4 pages.
ZTE, "Uplink Control Channel Design for LTE-Advanced," R1-092464, TSG-RAN WG1 #57bis, San Francisco, USA, Jun. 29,-Jul. 3, 2009, 6 pages.
Texas Instruments, "Multiple ACK/NAK Transmission in TDD," R1-083124, 3GPP TSG RAN WG1 #54, Agenda Item: 6.3, Jeju, South Korea, Aug. 18-22, 2008, 5 pages.
ZTE, RAN 1, "Clarification of concurrent ACKNACK and periodic PMI/RI transmission on PUCCH for TDD," R1-093678, 3GPP TSG-RAN 1 Meeting #58, Shenzhen, P.R. China, Aug. 24-28, 2009, 5 pages.

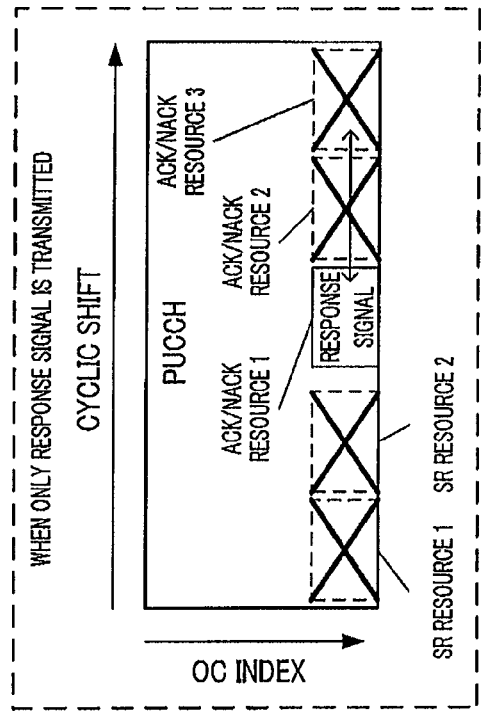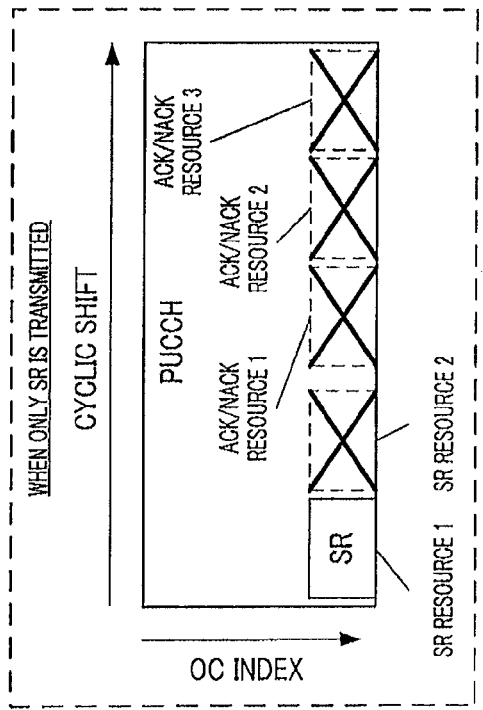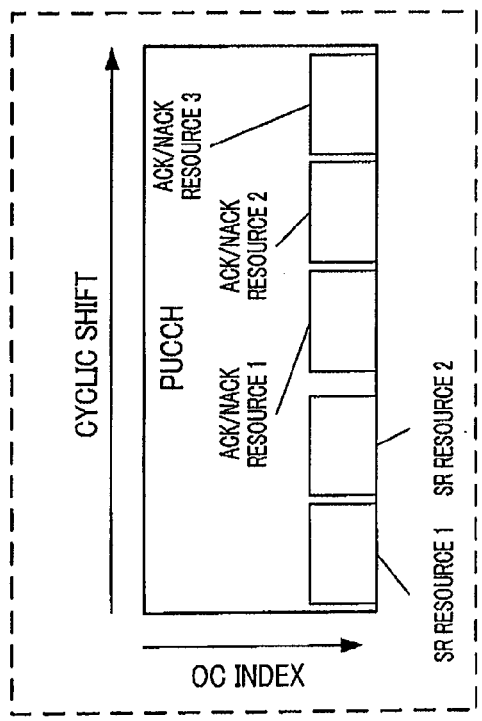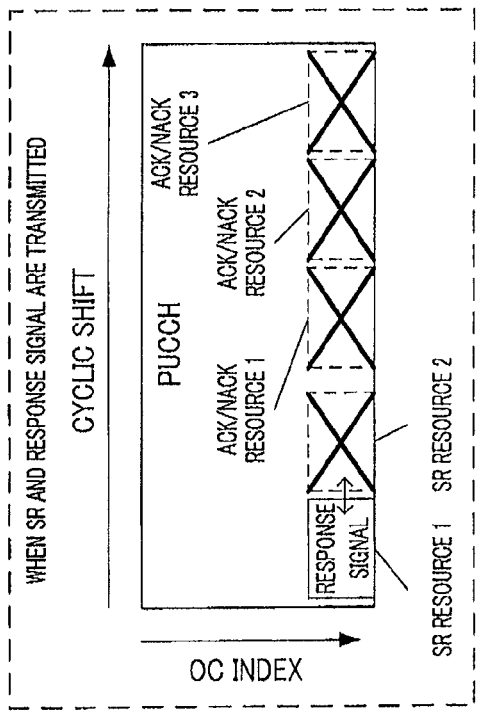

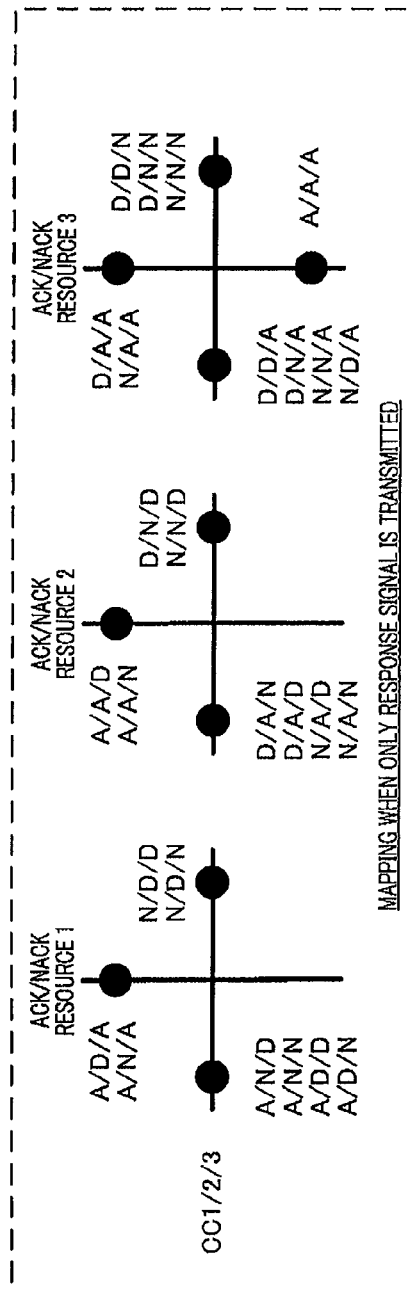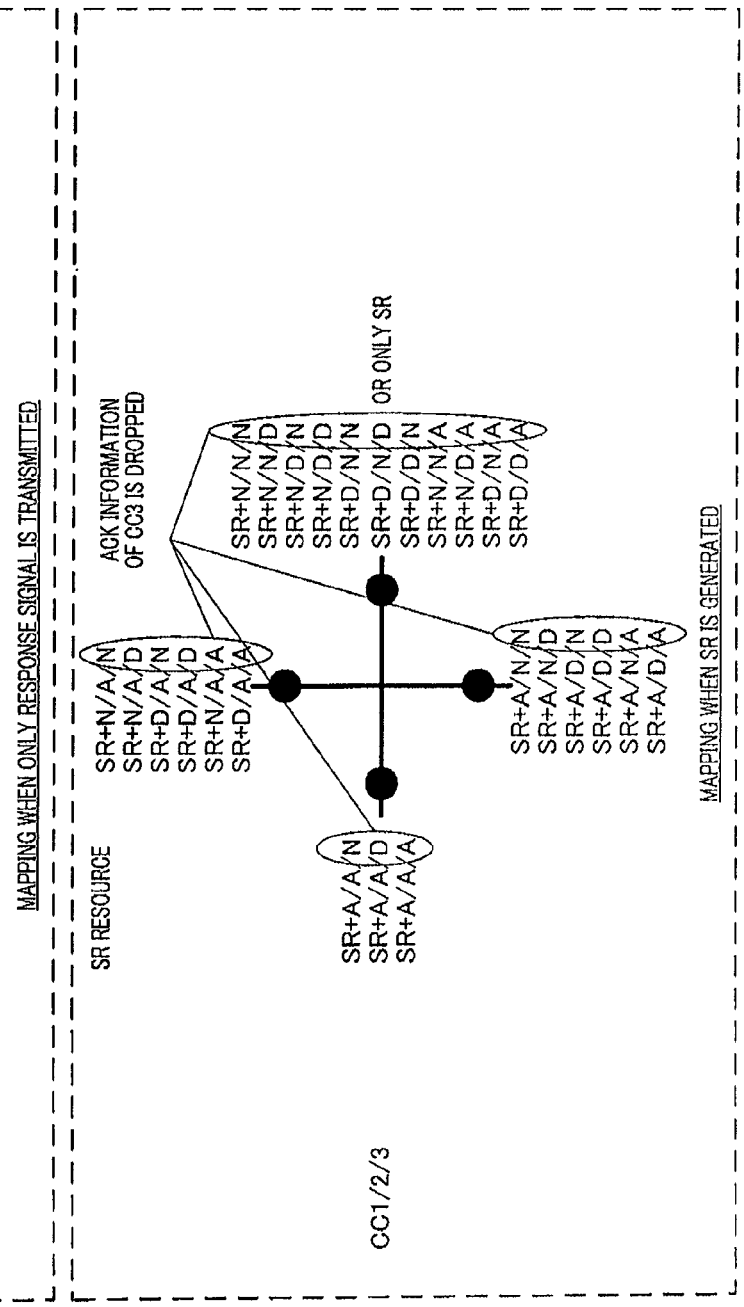
FIG.13A
FIG.13B

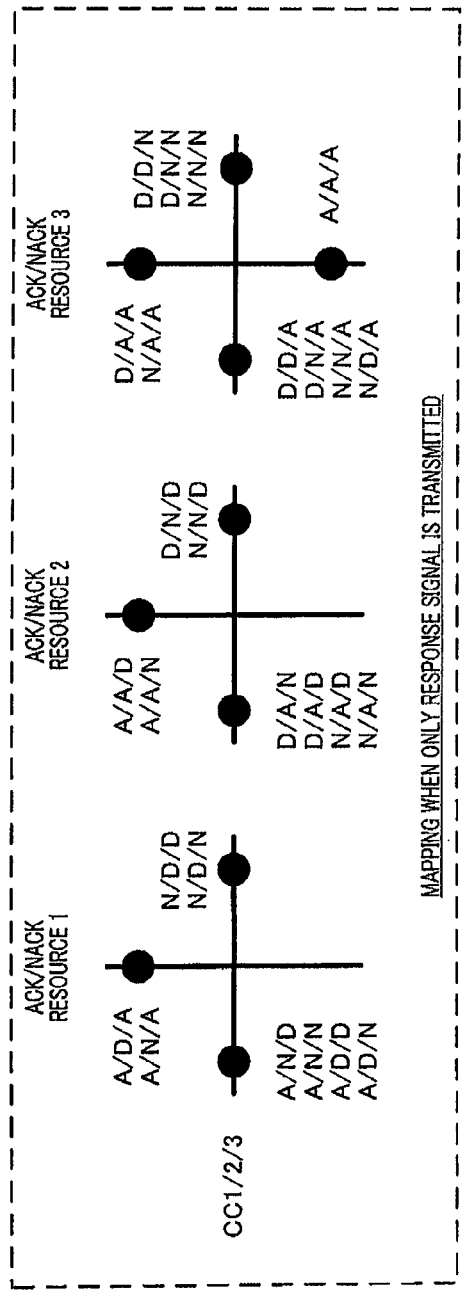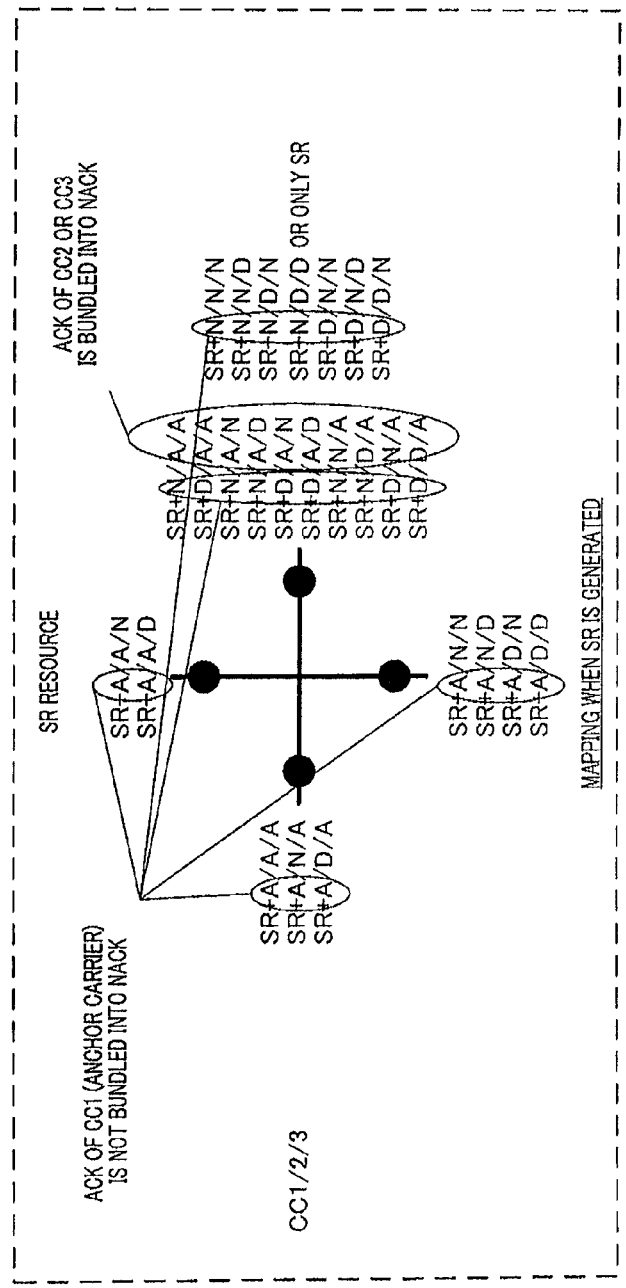
FIG.15A
FIG.15B

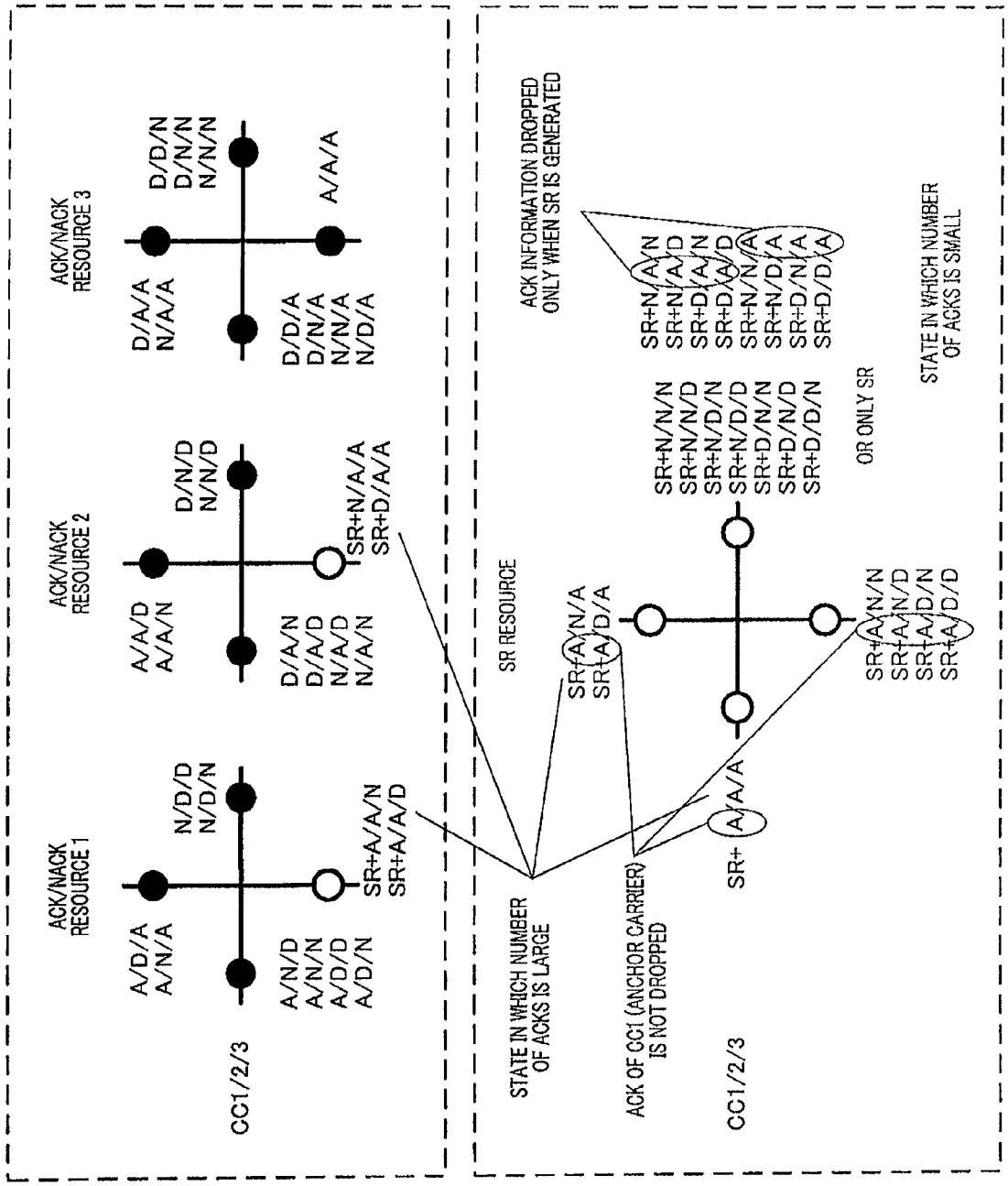

BASE STATION AND RELATED RADIO COMMUNICATION METHOD

BACKGROUND

Technical Field

The present invention relates to a terminal apparatus and a retransmission control method.

Description of the Related Art

3GPP long term evolution (LTE) adopts orthogonal frequency division multiple access (OFDMA) as a downlink communication scheme. In a radio communication system to which 3GPP LTE is applied, a base station transmits a synchronization signal (synchronization channel: SCH) and a broadcast signal (broadcast channel: BCH) using predetermined communication resources. A terminal first secures synchronization with the base station by catching an SCH. Then, the terminal acquires parameters (e.g. frequency bandwidth) specific to the base station by reading BCH information (see Non-Patent Literatures 1, 2, and 3).

Furthermore, after completing the acquisition of the parameters specific to the base station, the terminal transmits a connection request to the base station and establishes communication with the base station. The base station transmits control information to the terminal with which communication is established through a physical downlink control channel (PDCCH) as necessary.

The terminal then makes a "blind decision" on each of a plurality of pieces of control information included in the received PDCCH signal. That is, the control information includes a cyclic redundancy check (CRC) portion, and this CRC portion is masked with a terminal ID of a transmission target terminal in the base station. Therefore, the terminal is difficult to decide whether or not the control information is directed to its own terminal until the CRC portion of the received control information is demasked with the terminal ID of the terminal. In the blind decision, when a demasking result represents that a CRC calculation is OK, it is determined that the control information is directed to its own terminal.

Furthermore, in 3GPP LTE, automatic repeat request (ARQ) is applied to downlink data from a base station to a terminal. That is, the terminal feeds back a response signal indicating an error detection result of downlink data to the base station. The terminal performs a CRC on the downlink data, and feeds back acknowledgment (ACK) when CRC=OK (no error) and negative acknowledgment (NACK) when CRC=NG (error) to the base station as a response signal. A binary phase shift keying (BPSK) scheme is used for modulation of the response signal (that is, the ACK/NACK signal). Further, an uplink control channel such as a physical uplink control channel (PUCCH) is used for feedback of the response signal. When the received response signal represents NACK, the base station transmits retransmission data to the terminal.

Here, the control information transmitted from the base station includes resource assignment information including resource information and the like assigned from the base station to the terminal. The PDCCH is used for transmission of this control information as described above. The PDCCH is configured with one or more L1/L2 control channels (L1/L2 CCHs). Each L1/L2 CCH is configured with one or more control channel elements (CCEs). That is, a CCE is a base unit for mapping control information to a PDCCH. Furthermore, when one L1/L2 CCH is configured with a plurality of CCEs, a plurality of CCEs whose indices are consecutive are assigned to the L1/L2 CCH. The base station assigns an L1/L2 CCH to a resource assignment target terminal according to the number of CCEs necessary for notifying control information to the resource assignment target terminal. The base station then transmits the control information mapped to a physical resource corresponding to the CCE of the L1/L2 CCH.

Here, each CCE has a one-to-one correspondence with a component resource of the PUCCH. Therefore, the terminal that has received the L1/L2 CCH can implicitly specify a component resource of the PUCCH corresponding to the CCEs configuring the L1/L2 CCH, and transmits a response signal to the base station using the specified resource. This allows downlink communication resources to be used efficiently.

As illustrated in FIG. 1, a plurality of response signals transmitted from a plurality of terminals are spread by a Zero Auto-correlation (ZAC) sequence having a Zero Auto-correlation characteristic, a Walsh sequence, and a discrete Fourier transform (DFT) sequence on a time axis, and code-multiplexed within the PUCCH. In FIG. 1, ($W_0$, $W_1$, $W_2$, $W_3$) represents a Walsh sequence (which may be also referred to as "Walsh code sequence" or "Walsh code") having a sequence length of 4, and ($F_0$, $F_1$, $F_2$) represents a DFT sequence having a sequence length of 3. As illustrated in FIG. 1, in the terminal, a response signal of ACK or NACK is first primary-spread to frequency components corresponding to a one single carrier frequency division multiple access (1 SC-FDMA) symbol on a frequency axis by a ZAC sequence (having a sequence length of 12). Next, the response signal subjected to the primary spreading and the ZAC sequence functioning as a reference signal are secondary-spread in association with a Walsh sequence (having a sequence length 4: $W_0$ to $W_3$) and a DFT sequence (having a sequence length 3: $F_0$ to $F_2$) respectively. Further, the signal subjected to the second spreading is transformed into a signal having a sequence length of 12 on the time axis by the inverse fast Fourier transform (IFFT). Then, a cyclic prefix (CP) is added to the signal that has been subjected to the IFFT, and thus a one-slot signal including 7 SC-FDMA symbols is generated.

Here, response signals transmitted from different terminals are spread using sequences corresponding to different cyclic shift indices or orthogonal cover (OC) indices (that is, a set of a Walsh sequence and a DFT sequence). Therefore, the base station can demultiplex a plurality of code-multiplexed response signals using a conventional dispreading process and a conventional correlation process (see Non-Patent Literature 4).

However, since each terminal makes a blind decision on a downlink assignment control signal in each subframe directed to its own terminal, the terminal side does not necessarily succeed in receiving the downlink assignment control signal. When the terminal fails to receive the downlink assignment control signal directed to its own terminal in a certain downlink unit band, the terminal is difficult to know whether or not there is downlink data, directed to its own terminal, in the downlink unit band. Therefore, when failing to receive the downlink assignment control signal in a certain downlink unit band, the terminal is difficult to generate a response signal on the downlink data in the downlink unit band. This error case is defined as discontinuous transmission (DTX) of a response signal (DTX of ACK/NACK signals) in the sense that the terminal side does not transmit the response signal.

Meanwhile, the uplink control channel (PUCCH) is also used for transmission of a scheduling request (SR) (which may be also represented by a scheduling request indicator (SRI)) which is an uplink control signal indicating that uplink data to be transmitted from the terminal side has been generated. When a connection with the terminal has been established, the base station individually assigns a resource to be used for transmission of the SR (hereinafter, referred to as "SR resource") to each terminal. Further, an on-off keying (OOK) scheme is applied to the SR, and the base station detects the SR from the terminal based on whether or not the terminal is transmitting an arbitrary signal using the SR resource. Further, the SR is spread using a ZAC sequence, a Walsh sequence, and a DFT sequence in the same manner as the above-mentioned response signal.

In the LTE system, the SR and the response signal may be generated in the same sub frame. In this case, when the terminal code-multiplexes and transmits the SR and the response signal, a peak to average power ratio (PAPR) of a synthesized waveform of a signal transmitted from the terminal significantly deteriorates. However, in the LTE system, since importance is put on amplification efficiency of the terminal, when the SR and the response signal have been generated in the same sub frame at the terminal side, the terminal transmits the response signal (response signals illustrated in FIGS. 2A to 2D) using the SR resource previously individually assigned to each terminal, without using a resource (hereinafter, referred to as "ACK/NACK resource") used for transmission of the response signal as illustrated in FIG. 2A.

That is, when the terminal side has only to transmit only a response signal ("when only response signal is transmitted" illustrated in FIG. 2C), the terminal transmits the response signal (a response signal illustrated in FIG. 2C) using the ACK/NACK resource. On the other hand, when the SR and the response signal have been generated in the same sub frame at the terminal side ("when response signal and SR are transmitted" illustrated in FIG. 2D), the terminal transmits the response signal (a response signal illustrated in FIG. 2D) using the SR resource.

Thus, the PAPR of the synthesized waveform of the signal transmitted from the terminal can be reduced. At this time, the base station detects the SR from the terminal based on whether or not the SR resource is being used. In addition, the base station determines whether or not the terminal has transmitted either ACK or NACK, based on a phase (that is, a BPSK demodulation result) of a signal transmitted through the SR resource (the ACK/NACK resource when the SR resource is not used).

Further, the standardization of 3GPP LTE-advanced that realizes faster communication than 3GPP LTE has started. A 3GPP LTE-advanced system (which may also be hereinafter referred to as "LTE-A system") follows the 3GPP LTE system (which may also be hereinafter referred to as "LTE system"). In order to realize a downlink transmission rate of a maximum of 1 Gbps or above, 3GPP LTE-advanced is expected to introduce base stations and terminals capable of performing communication at a wideband frequency of 40 MHz or above.

In an LTE-A system, in order to simultaneously realize communication at an ultra-high transmission rate several times as fast as a transmission rate in the LTE system and backward compatibility with the LTE system, a band for the LTE-A system is divided into "unit bands" of 20 MHz or less, which is a support bandwidth for the LTE system. That is, the "unit band" herein is a band having a width of maximum 20 MHz and defined as a base unit of a communication band. Furthermore, a "unit band" in a downlink (hereinafter, referred to as "downlink unit band") may be defined as a band divided by downlink frequency band information included in the BCH broadcasted from the base station, or a band defined by a dispersive width when the downlink control channel (PDCCH) is dispersed and arranged in the frequency domain. Further, a "unit band" in an uplink (hereinafter, referred to as "uplink unit band") may be defined as a band divided by uplink frequency band information included in the BCH broadcasted from the base station, or as a base unit of a communication band of 20 MHz or less, which includes a physical uplink shared channel (PUSCH) region near the center thereof and PUCCHs for the LTE at both ends thereof. Furthermore, in 3GPP LTE-Advanced, the "unit band" may also be expressed as "component carrier(s)" in English.

The LTE-A system supports communication using a band that bundles several unit bands, so-called "carrier aggregation." Since throughput requirements for an uplink are generally different from throughput requirements for a downlink, in the LTE-A system, carrier aggregation in which the number of unit bands set for a terminal supporting arbitrary LTE-A system (hereinafter referred to as "LTE-A terminal") is different between the uplink and the downlink, so-called "asymmetric carrier aggregation" is being discussed. Cases are also supported where the number of unit bands is asymmetric between the uplink and the downlink, and different unit bands have different frequency bandwidths.

FIGS. 3A and 3B are diagrams illustrating asymmetric carrier aggregation applied to individual terminals and a control sequence thereof. FIGS. 3A and 3B illustrates an example in which a bandwidth and the number of unit bands are symmetric between an uplink and a downlink in a base station.

In FIG. 3B, a setting (configuration) is made for terminal 1 such that carrier aggregation is performed using two downlink unit bands and one uplink unit band on the left side, whereas a setting is made for terminal 2 such that although the two same downlink unit bands as those in terminal 1 are used, the uplink unit band on the right side is used for uplink communication.

Focusing attention on terminal 1, signals are transmitted/received between an LTE-A base station and an LTE-A terminal configuring an LTE-A system according to a sequence diagram illustrated in FIG. 3B. As illustrated in FIG. 3A, (1) terminal 1 is synchronized with the downlink unit band (DL CC1) on the left side illustrated in FIG. 3B when communication with the base station starts, and reads information of the uplink unit band which forms a pair with the downlink unit band on the left side from a broadcast signal called "system information block type 2 (SIB2)." (2) Using this uplink unit band (UL CC1), terminal 1 starts communication with the base station by transmitting, for example, a connection request to the base station. (3) Upon deciding that a plurality of downlink unit bands need to be assigned to the terminal, the base station instructs the terminal to add a downlink unit band (DL CC2). In this case, however, the number of uplink unit bands does not increase, and terminal 1 which is an individual terminal starts asymmetric carrier aggregation.

Furthermore, in the LTE-A to which the carrier aggregation is applied, a terminal may receive a plurality of downlink data in a plurality of downlink unit bands at a time. In the LTE-A, a channel selection (which may be also referred to as "multiplexing" or "code selection") is being discussed as one of methods of transmitting a plurality of response signals in response to the plurality of downlink data. In the channel selection, not only a symbol used for a response signal but also a resource to which the response signal is mapped are changed according to a pattern of an error detection result on the plurality of downlink data. That is, the channel selection is a technique that changes not only a phase point (that is, a constellation point) of the response signal but also a resource used for transmitting the response signal based on whether each of response signals in response to a plurality of downlink data received in a plurality of downlink unit bands is ACK or NACK as illustrated in FIG. 4 (see Non-Patent Literatures 5, 6, and 7).

Here, ARQ control based on the channel selection when the above-described asymmetric carrier aggregation is applied to a terminal will be described below with reference to FIG. 4.

For example, as illustrated in FIG. 4, when a unit band group (which may be expressed as "component carrier set" in English) configured with downlink unit bands 1 and 2 and uplink unit band 1 is set for terminal 1, downlink resource assignment information is transmitted from the base station to terminal 1 through respective PDCCHs of downlink unit bands 1 and 2, and then downlink data is transmitted using a resource corresponding to the downlink resource assignment information.

When the terminal succeeds in receiving the downlink data at unit band 1 and fails to receive the downlink data at unit band 2 (that is, when a response signal of unit band 1 is ACK and a response signal of unit band 2 is NACK), the response signal is mapped to a PUCCH resource included in PUCCH region 1, and a first phase point (e.g. a phase point (1, 0)) is used as a phase point of the response signal. Further, when the terminal succeeds in receiving the downlink data at unit band 1 and also succeeds in receiving the downlink data at unit band 2, the response signal is mapped to a PUCCH resource included in PUCCH region 2, and the first phase point is used. That is, when there are two downlink unit bands, there are four error detection result patterns, so that the four patterns can be represented by combinations of two resources and two types of phase points.

CITATION LIST

Patent Literature

NPL 1
3GPP TS 36.211 V8.7.0, "Physical Channels and Modulation (Release 8)," May 2009
NPL 2
3GPP TS 36.212 V8.7.0, "Multiplexing and channel coding (Release 8)," May 2009
NPL 3
3GPP TS 36.213 V8.7.0, "Physical layer procedures (Release 8)," May 2009
NPL 4
Seigo Nakao, Tomofumi Takata, Daichi Imamura, and Katsuhiko Hiramatsu, "Performance enhancement of E-UTRA uplink control channel in fast fading environments," Proceeding of IEEE VTC 2009 spring, April. 2009
NPL 5
ZTE, 3GPP RAN1 meeting #57 bis, R1-092464, "Uplink Control Channel Design for LTE-Advanced," June 2009
NPL 6
Panasonic, 3GPP RAN1 meeting #57 bis, R1-092535, "UL ACK/NACK transmission on PUCCH for carrier aggregation," June 2009
NPL 7
Nokia Siemens Networks, Nokia, 3GPP RAN1 meeting #57 bis, R1-092572, "UL control signalling for carrier aggregation," June 2009

BRIEF SUMMARY

Technical Problem

As described above, the SR resource and the ACK/NACK resource have the same format, and when the SR and the response signal are simultaneously transmitted, the terminal transmits the response signal using the SR resource. Here, when the channel selection is applied in the LTE-A system as a method of transmitting the response signal, the ACK/NACK resources the number of which is equal to the number of downlink unit bands set to the terminal (2 ACK/NACK resources in FIG. 4) are used as described above. Further, when the same technique (that is, a technique of transmitting the SR according to which of the SR resource and the ACK/NACK resource is used) as in the LTE is used in the LTE-A system so as to simultaneously transmit the SR and the response signal, the SR resources the number of which is equal to the number of the ACK/NACK resources are necessary.

That is, as illustrated in FIG. 5A, in the case in which the channel selection is applied using the two ACK/NACK resources, when the same technique as in the LTE is used to simultaneously transmit the SR and the response signal, the two SR resources the number of which is equal to the number of the ACK/NACK resources are necessary. For example, when the terminal does not generate the SR and transmits only the response signal ("when only response signal is transmitted" illustrated in FIG. 5B), the terminal contains information as to not only a symbol (i.e., a phase point) used for the response signal but also which one of the two ACK/NACK resources (PUCCH regions 1 and 2 in FIG. 4) the response signal has been mapped to, and then transmits a signal (the response signal). On the other hand, when the terminal has generated the SR and the response signal in the same sub frame ("when response signal and SR are transmitted" illustrated in FIG. 5C), the terminal contains information as to not only a symbol (i.e. a phase point) used for the response signal but also which one of the two SR resources the response signal has been mapped to, and then transmits a signal (the response signal).

Thus, the base station can recognize a generation status of the SR at the terminal side by which resources belonging to the "SR resource group" including the two SR resources or the "ACK/NACK resource group" including the two ACK/NACK resources a used. Further, the base station can recognize whether or not the terminal has succeeded in receiving downlink data transmitted in each unit band by a resource belonging to the resource group used at the terminal side and a phase point of the resource.

As described above, when the channel selection is used, it is necessary to prepare a plurality of SR resources and a plurality of ACK/NACK resources (two SR resources and two ACK/NACK resources in FIG. 5A). However, as illustrated in FIGS. 5B to 5D, only one PUCCH resource among the four PUCCH resources (the two SR resources and the two ACK/NACK resources) is used in a certain sub frame. That is, the three PUCCH resources among the four PUCCH resources are always not used in a certain sub frame.

As described above, when the channel selection is applied in the LTE-A as a method of transmitting the response signal, if it is considered the case in which the SR and the response signal are simultaneously generated in the same sub frame, the overhead of the uplink control channel (PUCCH) wastefully increases.

It is an object of the present invention to provide a terminal apparatus and a retransmission control method, which are capable of suppressing an increase in the overhead of the uplink control channel (PUCCH) even when the channel selection is applied as method of transmitting the response signal when carrier aggregation communication is performed using a plurality of downlink unit bands.

Solution to Problem

A terminal apparatus of the present invention is a terminal apparatus that communicates with a base station using a unit band group including a plurality of downlink unit bands and at least one uplink unit band and has a configuration including a control information receiving section that receives downlink assignment control information corresponding to downlink data transmitted in at least one downlink unit band in the unit band group, a downlink data receiving section that receives downlink data corresponding to the downlink assignment control information, an error detecting section that detects a reception error of the received downlink data, and a control section that transmits an uplink control signal representing generation of uplink data or a response signal through an uplink control channel of the uplink unit band, using a transmission rule of the response signal, based on a generation status of the uplink data and an error detection result obtained by the error detecting section, wherein the transmission rule, when the uplink control signal and the response signal have been simultaneously generated within a transmission unit time, a pattern candidate of the error detection result is associated with a pair of a resource of an uplink control channel to which the response signal is assigned and a phase point of the response signal, different pairs are associated with different pattern candidate groups which are different in the number of ACKs included in a pattern, and different pairs are associated with different pattern candidate groups which are the same in the number of ACKs included in a pattern but different in a position of ACK in a pattern.

A retransmission control method of the present invention includes a control information receiving step of receiving downlink assignment control information corresponding to downlink data transmitted in at least one downlink unit band in a unit band group including a plurality of downlink unit bands and at least one uplink unit band, a downlink data receiving step of receiving downlink data corresponding to the downlink assignment control information, an error detecting step of detecting a reception error of the received downlink data, and a control step of transmitting an uplink control signal representing generation of uplink data or a response signal through an uplink control channel of the uplink unit band, using a transmission rule of the response signal, based on a generation status of the uplink data and an error detection result obtained by the error detecting step, wherein when the uplink control signal and the response signal have been simultaneously generated within a transmission unit time, the control step includes causing a pair of a resource to which the response signal is assigned and a phase point of the response signal to be different according to the number of ACKs in an error detection result pattern, and causing a pair of a resource to which the response signal is assigned and a phase point of the response signal to be different according to a position of ACK in a pattern, when a plurality of error detection result patterns having the same number of ACKs are present.

Advantageous Effects of Invention

According to the present invention, a terminal apparatus and a retransmission control method can be provided which are capable of suppressing an increase in the overhead of the uplink control channel (PUCCH) even when the channel selection is applied as method of transmitting the response signal when carrier aggregation communication is performed using a plurality of downlink unit bands.

BRIEF DESCRIPTION OF THE SEVERAL VIEWS OF THE DRAWINGS

FIGS. 10A to 10D are diagrams for describing a method of transmitting an SR and a response signal by a terminal according to Embodiment 1 of the present invention (when three downlink unit bands are set to a terminal);

FIGS. 13A and 13B are diagrams for describing mapping of a response signal in an ACK/NACK resource and an SR resource according to Embodiment 2 of the present invention (mapping example 1);

FIGS. 15A and 15B are diagrams for describing mapping of a response signal in an ACK/NACK resource and an SR resource according to Embodiment 2 of the present invention (mapping example 3);

FIGS. 16A and 16B are diagrams for describing mapping of a response signal in an ACK/NACK resource and an SR resource according to Embodiment 2 of the present invention (mapping example 4)

DETAILED DESCRIPTION

Figure 1:
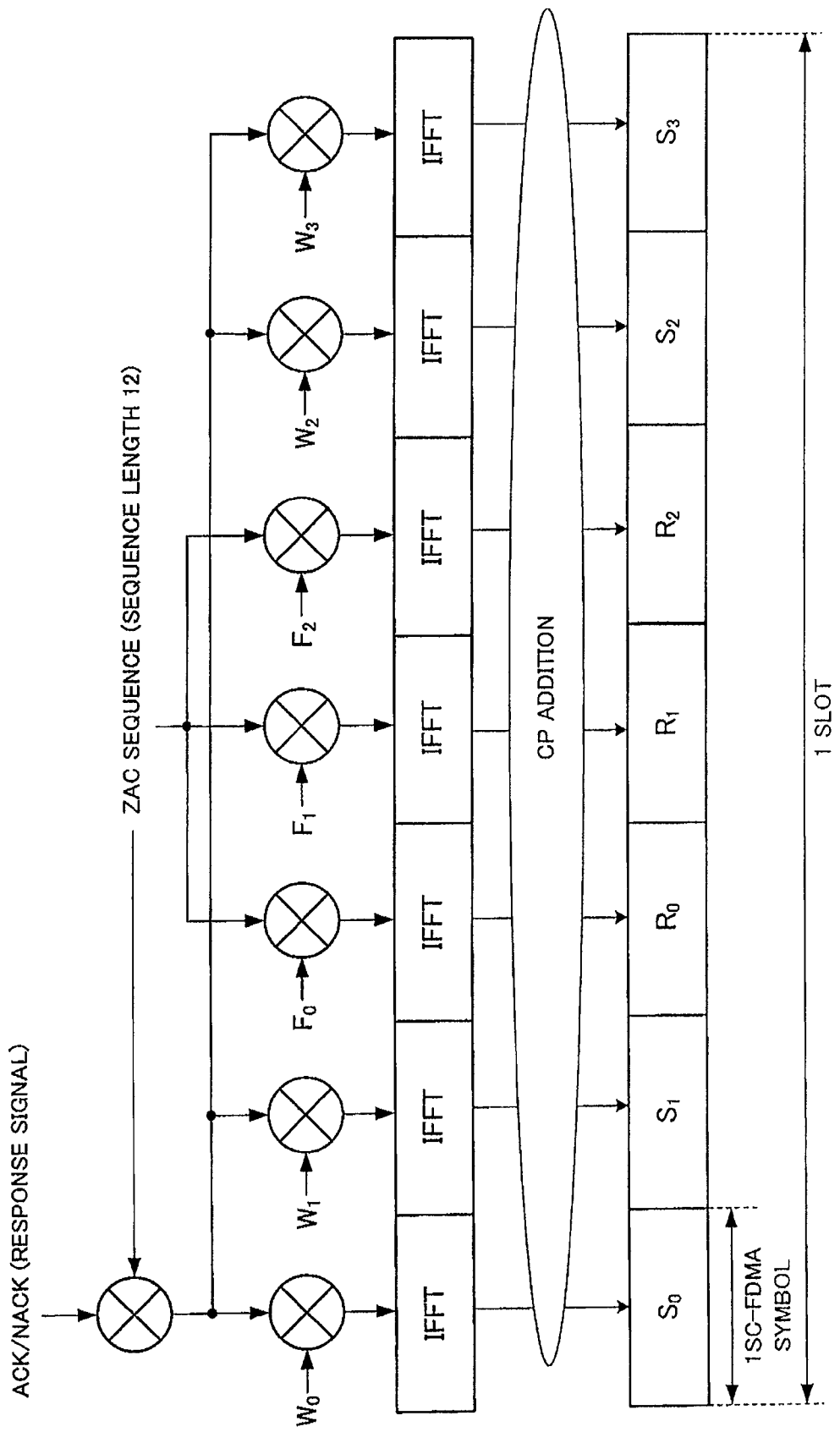
FIG. 1 is a diagram illustrating a method of spreading a response signal and reference signal.
Figure 2B:
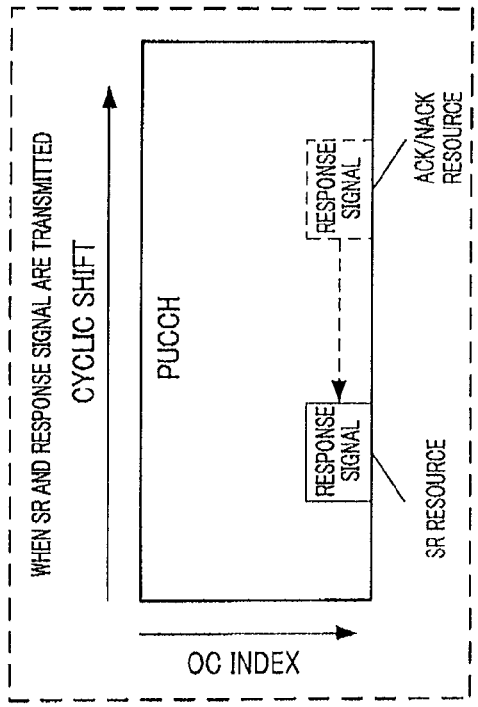
FIGS. 2A to 2D are diagrams for describing a method of transmitting an SR and a response signal by a terminal.
Figure 2D:
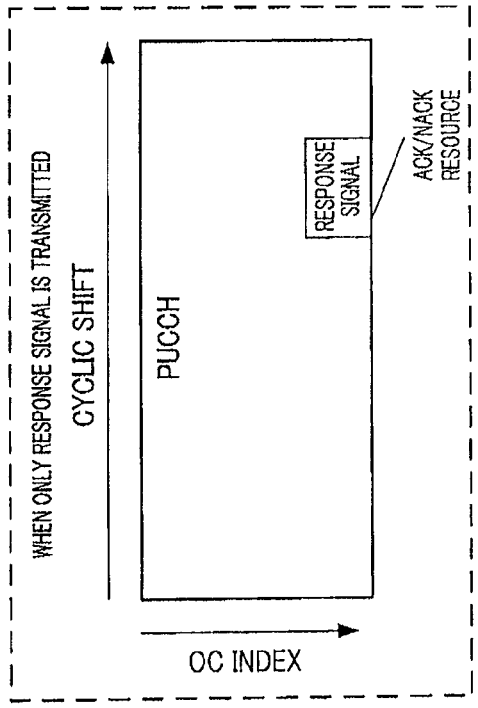
Figure 2A:
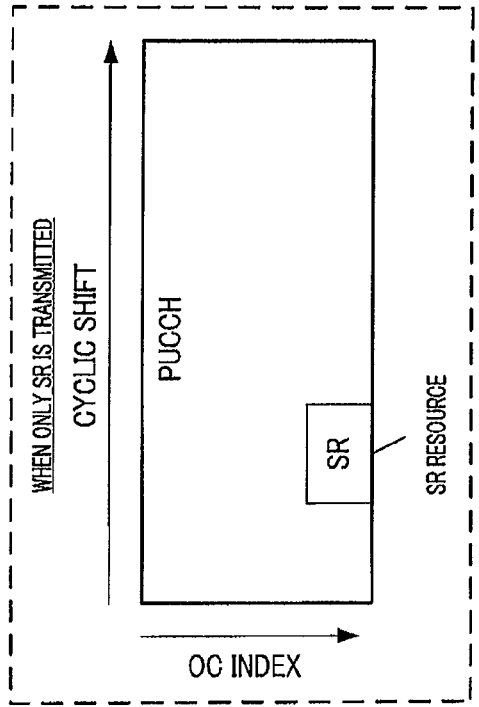
Figure 2C:
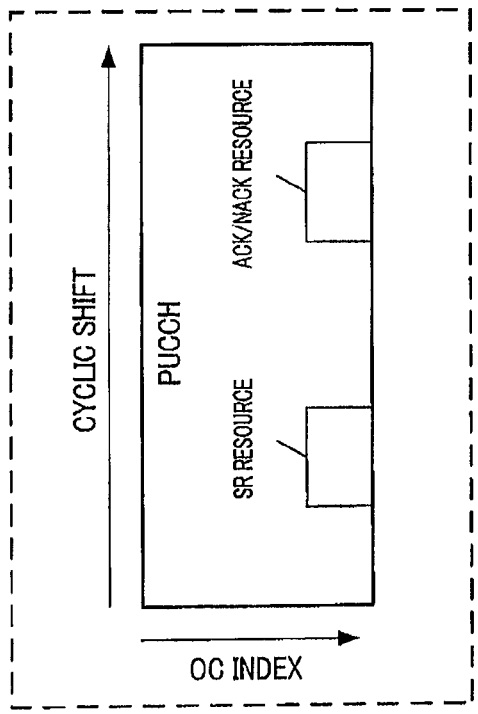
Figure 3B:
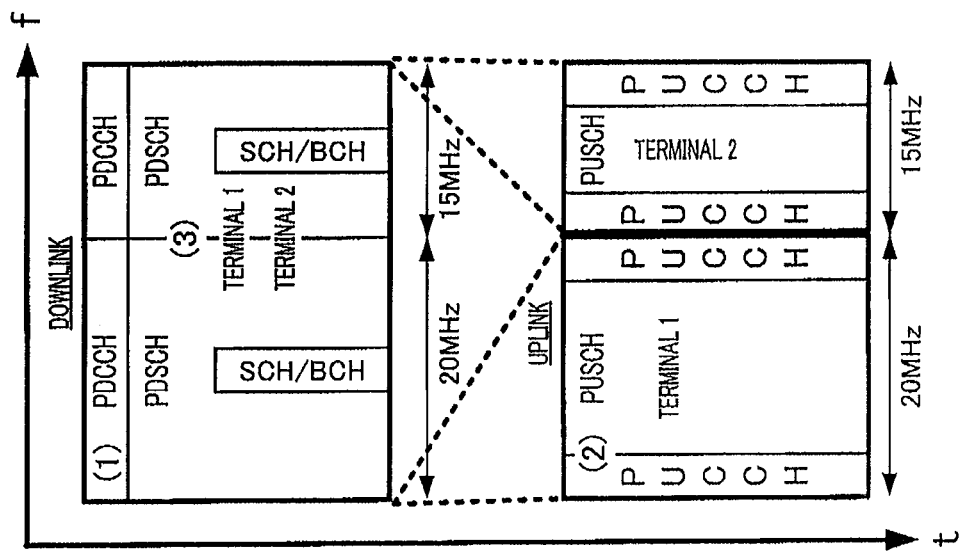
FIGS. 3A and 3B are diagrams for describing asymmetric carrier aggregation applied to individual terminals and control sequence thereof.
Figure 3A:
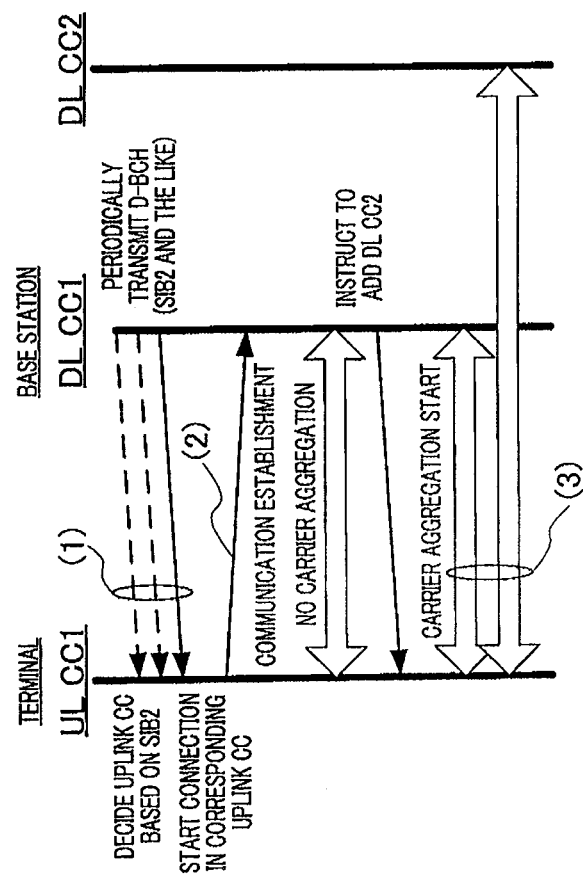

Hereinafter, embodiments of the present invention will be described in detail with reference to the accompanying drawings. In the following embodiments, like reference numerals denote like parts, and the redundant description will not be repeated.

Embodiment 1

Overview of Communication System

In a communication system including base station 100 and terminal 200 which will be described later, communication using uplink unit bands and a plurality of downlink unit bands associated with the uplink unit bands is performed, that is, communication based on asymmetric carrier aggregation specific to terminal 200 is performed. This communication system also includes a terminal that does not have a function of performing communication based on carrier aggregation and performs communication by one downlink unit band and one uplink unit band associated with the downlink unit band (that is, communication not based on carrier aggregation), unlike terminal 200.

Thus, base station 100 is configured to support both communications based on asymmetric carrier aggregation and communication not based on carrier aggregation.

Communication not based on carrier aggregation may be performed between base station 100 and terminal 200 according to resource assignment with respect to terminal 200 by base station 100.

In this communication system, when communication not based on carrier aggregation is performed, the ARQ is performed as in the conventional art, whereas when communication based on carrier aggregation is performed, the channel selection is employed in the ARQ. That is, this communication system is, for example, an LTE-A system, base station 100 is, for example, an LTE-A base station, and terminal 200 is, for example, an LTE-A terminal. The terminal having no function of performing communication based on carrier aggregation is, for example, an LTE terminal.

In the following, a description will be made under the premise of the following. That is, asymmetric carrier aggregation specific to terminal 200 is configured between base station 100 and terminal 200 in advance, and information of a downlink unit band and an uplink unit band used by terminal 200 is shared between base station 100 and terminal 200.

[Configuration of Base Station]

Figure 6:
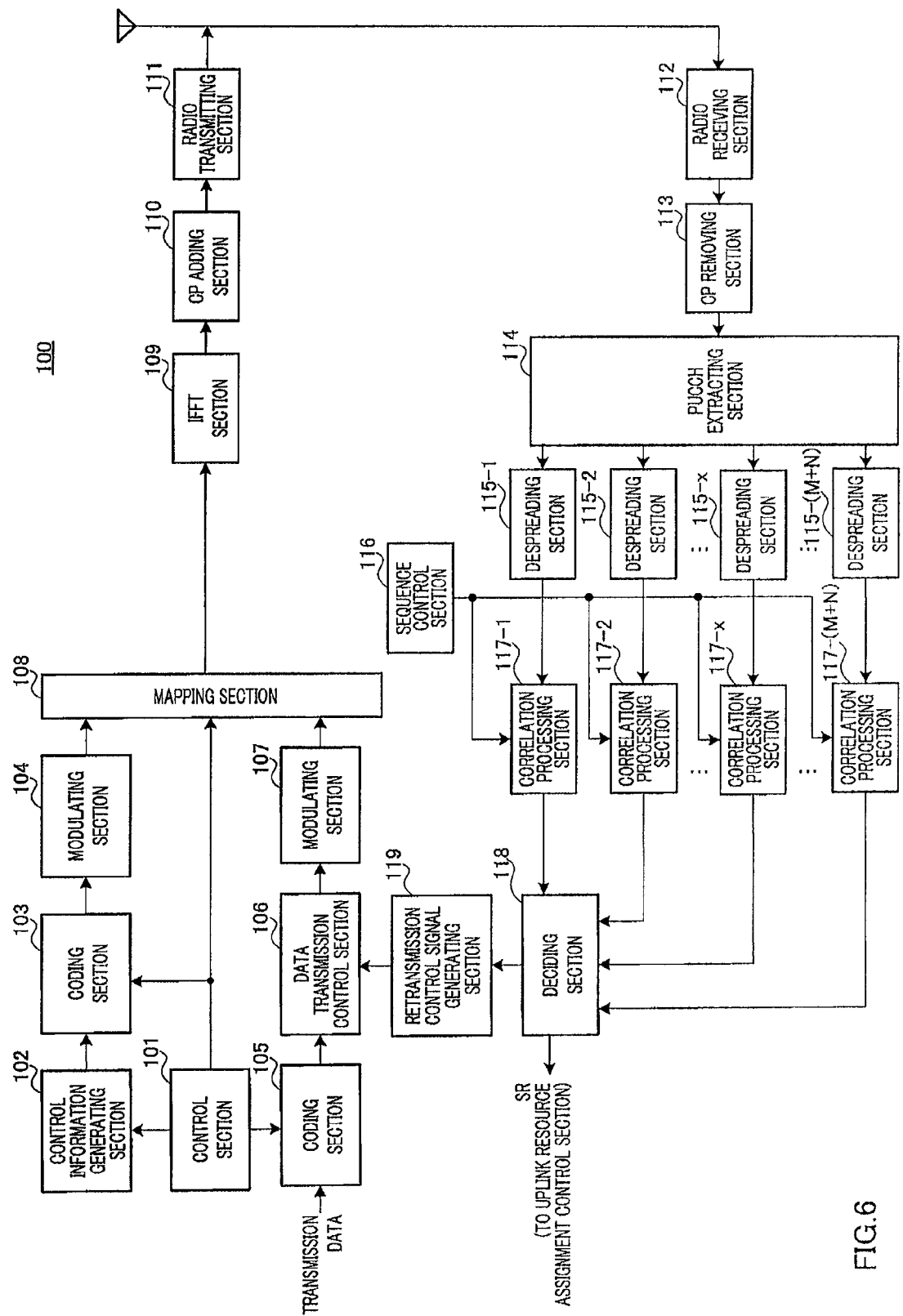
FIG. 6 is a block diagram illustrating a configuration of a base station according to Embodiment 1 of the present invention.

FIG. 6 is a block diagram illustrating a configuration of base station 100 according to Embodiment 1 of the present invention. Referring to FIG. 6, base station 100 includes control section 101, control information generating section 102, coding section 103, modulating section 104, coding section 105, data transmission control section 106, modulating section 107, mapping section 108, IFFT section 109, CP adding section 110, radio transmitting section 111, radio receiving section 112, CP removing section 113, PUCCH extracting section 114, despreading section 115, sequence control section 116, correlation processing section 117, deciding section 118, and retransmission control signal generating section 119.

Control section 101 assigns a downlink resource for transmitting control information (that is, a downlink control information assignment resource) and a downlink resource for transmitting downlink data (that is, a downlink data assignment resource) to resource assignment target terminal 200. This resource assignment is performed in a downlink unit band included in a unit band group set to resource assignment target terminal 200. The downlink control information assignment resource is selected from among resources corresponding to the downlink control channel (PDCCH) in each downlink unit band. Further, the downlink data assignment resource is selected from among resources corresponding to the downlink data channel (PDSCH) in each downlink unit band. Further, when a plurality of resource assignment target terminals 200 are present, control section 101 assign different resources to respective resource assignment target terminals 200.

The downlink control information assignment resources are equivalent to the above-described L1/L2 CCHs. That is, each of the downlink control information assignment resources is configured with one or more CCEs. Further, the CCEs included in the downlink unit band are associated with component resources of the uplink control channel region (PUCCH region) in an uplink unit band in the unit band group in a one-to-one correspondence manner (that is, an index of each CCE is associated with an index of the PUCCH in a one-to-one correspondence manner). That is, each CCE in a downlink unit band n is associated with a component resource of a PUCCH region n in an uplink unit band in a unit band group in a one-to-one correspondence manner.

Control section 101 determines a coding rate used to transmit control information to resource assignment target terminal 200. Since the amount of data of the control information differs according to this coding rate, control section 101 assigns downlink control information assignment resources having a number of CCEs to which the control information having this amount of data can be mapped.

Control section 101 outputs information related to the downlink data assignment resource to control information generating section 102. Further, control section 101 outputs information related to a coding rate to coding section 103. Further, control section 101 decides a coding rate of transmission data (that is, downlink data) and outputs the decided coding rate to coding section 105. Further, control section 101 outputs information related to the downlink data assignment resource and information related to the downlink control information assignment resource, to mapping section 108. Here, control section 101 performs control such that downlink data and downlink control information for the downlink data are mapped to the same downlink unit band.

Control information generating section 102 generates control information including information related to the downlink data assignment resource, and outputs the generated control information to coding section 103. This control information is generated for each downlink unit band. When a plurality of resource assignment target terminals 200 are present, a terminal ID of a destination terminal is included in the control information so as to discriminate between resource assignment target terminals 200. For example, the control information includes a CRC bit masked with the terminal ID of the destination terminal. This control information may be called "downlink assignment control information (control information carrying downlink assignment)."

Coding section 103 encodes the control information according to the coding rate received from control section 101, and outputs the encoded control information to modulating section 104.

Modulating section 104 modulates the encoded control information and outputs the modulated signal to mapping section 108.

Coding section 105 receives transmission data (that is, downlink data) of each destination terminal 200 and the coding rate information from control section 101 as input, encodes the transmission data, and outputs the encoded transmission data to data transmission control section 106. Here, when a plurality of downlink unit bands are assigned to destination terminal 200, each transmission data transmitted through each downlink unit band is encoded, and the encoded transmission data is then output to data transmission control section 106.

At the time of first time transmission, data transmission control section 106 retains the encoded transmission data and also outputs the encoded transmission data to modulating section 107. The encoded transmission data is retained for each destination terminal 200. Further, transmission data to one destination terminal 200 is retained for each downlink unit band to transmit. Thus, not only retransmission control of all data to be transmitted to destination terminal 200 but also retransmission control of each downlink unit band can be performed.

Further, upon receiving NACK or DTX for downlink data transmitted through a certain downlink unit band from retransmission control signal generating section 119, data transmission control section 106 outputs retention data corresponding to the downlink unit band to modulating section 107. Upon receiving ACK for downlink data transmitted in a certain downlink unit band from retransmission control signal generating section 119, data transmission control section 106 deletes retention data corresponding to the downlink unit band.

Modulating section 107 modulates the encoded transmission data received from data transmission control section 106, and outputs a modulated signal to mapping section 108.

Mapping section 108 maps the modulated signal of the control information received from modulating section 104 to a resource represented by the downlink control information assignment resource received from control section 101, and outputs a mapping result to IFFT section 109.

Further, mapping section 108 maps the modulated signal of the transmission data received from modulating section 107 to a resource represented by the downlink data assignment resource received from control section 101, and outputs a mapping result to IFFT section 109.

The control information and the transmission data mapped to a plurality of sub carriers in a plurality of downlink unit bands by mapping section 108 are transformed from frequency-domain signals into time-domain signals by IFFT section 109, are transformed into OFDM signals with a CP added by CP adding section 110, are subjected to a transmission process such as a digital to analog (D/A) conversion process, an amplification process and an up-conversion process by radio transmitting section 111, and are transmitted to terminal 200 through an antenna.

Radio receiving section 112 receives a response signal or a reference signal transmitted from terminal 200 through the antenna, and performs a reception process, such as a down-conversion process and an analog to digital (A/D) conversion process, on the response signal or the reference signal.

CP removing section 113 removes a CP added to the response signal or the reference signal that has been subjected to the reception process.

PUCCH extracting section 114 extracts PUCCH regions (PUCCH regions respectively corresponding to PUCCH resources) corresponding to M SR resources and N ACK/NACK resources from the PUCCH signal included in the received signal, and sorts the extracted PUCCH signals into processing systems corresponding to the respective resources. Terminal 200 transmits uplink control information (that is, either or both of the SR and the response signal) using any one of the PUCCH resources.

Despreading section 115-$x$ and correlation processing section 117-$x$ process the PUCCH signal extracted from the PUCCH region corresponding to an x-th PUCCH resource (the SR resource or the ACK/NACK resource. Here, x=1 to (M+N)). Base station 100 is provided with processing systems of despreading section 115 and correlation processing section 117 corresponding to each PUCCH resource x (the SR resource or the ACK/NACK resource. Here, x=1 to (M+N)) used by base station 100.

Specifically, despreading section 115 despreads a signal of a portion corresponding to the response signal using a Walsh sequence which terminal 200 uses for secondary spreading in each PUCCH resource (the SR resource or the ACK/NACK resource), and outputs the despread signal to correlation processing section 117. Further, despreading section 115 despreads a signal of a portion corresponding to the reference signal using a DFT sequence which terminal 200 uses for spreading of the reference signal in each PUCCH resource (the SR resource or the ACK/NACK resource), and outputs the despread signal to correlation processing section 117.

Sequence control section 116 generates a ZAC sequence that may be possibly used to spread the response signal and the reference signal transmitted from terminal 200. Further, sequence control section 116 specifies correlation windows that respectively correspond to (M+N) PUCCH resources (SR resources and ACK/NACK resources), based on PUCCH resource which may be possibly used by terminal 200. Then, sequence control section 116 outputs information representing the specified correlation window and the generated ZAC sequences to correlation processing section 117.

Correlation processing section 117 calculates a correlation value between the signal input from despreading section 115 and the ZAC sequence that may be possibly used for primary spreading in terminal 200 using the information representing the correlation window and the ZAC sequences input from sequence control section 116, and outputs the calculated correlation value to deciding section 118.

Deciding section 118 decides whether or not the SR and the response signal are being transmitted from terminal 200, based on the correlation value input from correlation processing section 117. That is, deciding section 118 decides whether or not any of the (M+N) PUCCH resources (SR resources and ACK/NACK resources) is being used by terminal 200 or whether or not none of the (M+N) PUCCH resources is being used by terminal 200.

For example, when it is decided that any one of the M SR resources is being used by terminal 200 at timing when the terminal 200 transmits the response signal in response to the downlink data, deciding section 118 decides that both the SR and the response signal are being transmitted from terminal 200. Further, when it is decided that any one of the M SR resources (or a predetermined one SR resource) is being used by terminal 200 at timing other than timing when the terminal 200 transmits the response signal in response to the downlink data, deciding section 118 decides that only the SR is being transmitted from terminal 200. Further, when it is decided that any of the N ACK/NACK resources is being used by terminal 200, deciding section 118 decides that only the response signal is being transmitted from terminal 200. Further, when it is decided that none of the resources is being used by the terminal, deciding section 118 decides that neither the SR nor the response signal is being transmitted from terminal 200.

In addition, when it is decided that terminal 200 is transmitting the SR, deciding section 118 outputs information related to the SR to an uplink resource assignment control section (not illustrated). Further, when it is decided that terminal 200 is transmitting the response signal, deciding section 118 decides a phase point represented by the response signal through synchronization detection. In detail, deciding section 118 first determines a PUCCH resource from which a maximum correlation value has been detected among PUCCH resources corresponding to correlation processing sections 117-1 to 117-(M+N). Next, deciding section 118 specifies a phase point of the response signal transmitted through the PUCCH resource from which the maximum correlation value has been detected, and specifies a reception status pattern that corresponds to the PUCCH resource, the specified phase point, and the number of downlink unit bands through which its own station has transmitted downlink data to terminal 200. Then, deciding section 118 individually generates an ACK signal or a NACK signal on data transmitted in each downlink unit band based on the specified reception status pattern, and outputs the ACK signal or the NACK signal to retransmission control signal generating section 119. Here, when all of correlation values obtained corresponding to the respective PUCCH resources are equal to or smaller than a specific threshold value, deciding section 118 decides that non response signal has been transmitted from terminal 200, generates DTX for all downlink data, and outputs the DTX to retransmission control signal generating section 119.

Further, when the uplink resource assignment control section (not illustrated) receives the SR, base station 100 transmits the uplink assignment control information (which may be also referred to as "uplink grant") that notifies an uplink data assignment resource, to terminal 200 so that terminal 200 can transmit uplink data. Thus, base station 100 decides whether or not a resource for uplink data needs to be assigned to terminal 200, based on the uplink control channel. The details of an operation in the uplink resource assignment control section and the details of an operation of base station 100 of assigning a resource for uplink data to terminal 200 will not be described.

Retransmission control signal generating section 119 generates a retransmission control signal for data (downlink data) transmitted at each downlink unit band based on the information input from deciding section 118. Specifically, when the response signal representing NACK or the DTX is received, retransmission control signal generating section 119 generates retransmission control signal representing a retransmission command, and outputs the retransmission control signal to data transmission control section 106. Further, when the response signal representing ACK is received, retransmission control signal generating section 119 generates a retransmission control signal representing that retransmission is not necessary, and outputs the retransmission control signal to data transmission control section 106.

[Configuration of Terminal]

Figure 7:
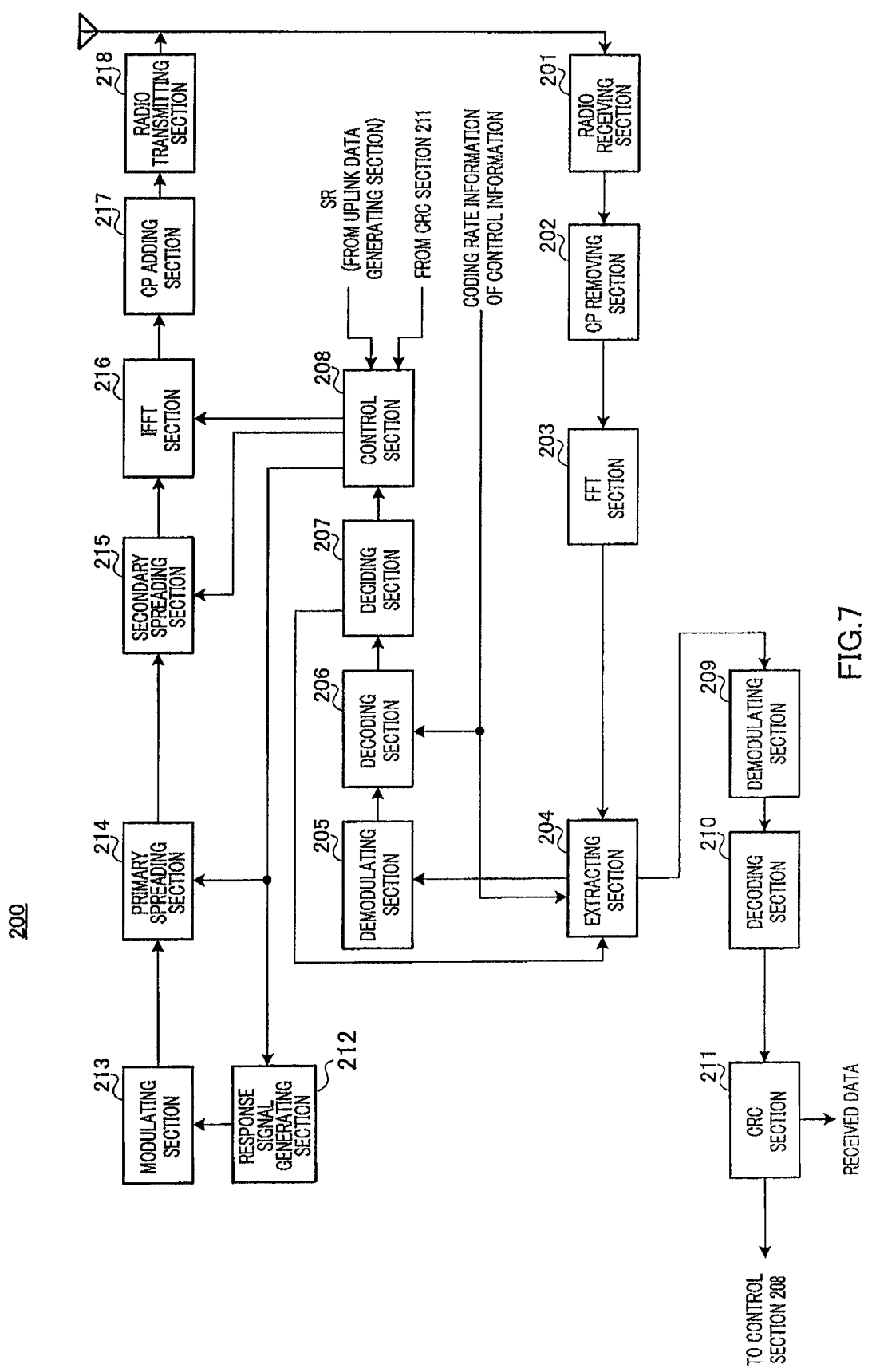
FIG. 7 is a block diagram illustrating a configuration of a terminal according to Embodiment 1 of the present invention.

FIG. 7 is a block diagram illustrating a configuration of terminal 200 according to Embodiment 1 of the present invention. Referring to FIG. 7, terminal 200 includes radio receiving section 201, CP removing section 202, fast Fourier transform (FFT) section 203, extracting section 204, demodulating section 205, decoding section 206, deciding section 207, control section 208, demodulating section 209, decoding section 210, CRC section 211, response signal generating section 212, modulating section 213, primary spreading section 214, secondary spreading section 215, IFFT section 216, CP adding section 217, and radio transmitting section 218.

Radio receiving section 201 receives an OFDM signal transmitted from base station 100 through an antenna, and performs a reception process, such as a down-conversion process, an A/D conversion process, on the received OFDM signal.

CP removing section 202 removes a CP added to the OFDM signal after the reception processing.

FFT section 203 transforms the received OFDM signal into a frequency domain signal by FFT and outputs the received signal to extracting section 204.

Further, extracting section 204 extracts the downlink control channel signal (the PDCCH signal) from the received signal received from FFT section 203 according to input coding rate information. That is, since the number of CCEs configuring the downlink control information assignment resource changes depending on the coding rate, extracting section 204 extracts the downlink control channel signal using the number of CCEs which corresponds to the coding rate as an extraction unit. Furthermore, the downlink control channel signal is extracted for each downlink unit band. The extracted downlink control channel signal is output to demodulating section 205.

Further, extracting section 204 extracts downlink data from the received signal based on the information related to the downlink data assignment resource, which is addressed to its own terminal, received from deciding section 207, and outputs the extracted downlink data to demodulating section 209.

Demodulating section 205 demodulates the downlink control channel signal received from extracting section 204, and outputs the obtained demodulation result to decoding section 206.

Decoding section 206 decodes the demodulation result received from demodulating section 205 according to the input coding rate information, and outputs the obtained decoding result to deciding section 207.

Deciding section 207 makes a blind decision as to whether or not control information included in the decoding result received from decoding section 206 is control information addressed to its own terminal. This decision is made using the decoding result corresponding to the extraction unit as a unit. For example, deciding section 207 demasks a CRC bit using the terminal ID of its own terminal, and decides control information with CRC=OK (no error) as the control information addressed to its own terminal. Then, deciding section 207 outputs information related to the downlink data assignment resource for its own terminal, which is included in the control information addressed to its own terminal, to extracting section 204.

Further, deciding section 207 specifies each CCE to which the control information addressed to its own terminal is mapped in the downlink control channel of each downlink unit band, and outputs an identification number (that is, CCE index) of the specified CCE to control section 208.

Control section 208 specifies a PUCCH resource (frequency/code) corresponding to the CCE to which the downlink control information received at an n-th (n=first to N-th) unit band is mapped, that is, a PUCCH resource n (That is, an ACK/NACK resource n) in a PUCCH region n, based on the CCE identification number received from deciding section 207. Then, control section 208 decides a PUCCH resource to be used to transmit the response signal, among the specified N ACK/NACK resources and the M SR resources previously notified from base station 100.

Specifically, control section 208 decides a PUCCH resource to be used and a phase point to be set so as to transmit a signal according to a transmission rule (a mapping rule) of the response signal, which will be described later, based on the generation status information of the SR received from an uplink data generating section (not illustrated) and an error detection result (that is, a reception success/failure pattern) of downlink data at each downlink unit band received from CRC section 211.

Then, control section 208 outputs information related to the phase point to be set, to response signal generating section 212, outputs the ZAC sequence and the cyclic shift index corresponding to the PUCCH resources to be used to primary spreading section 214 and outputs frequency resource information to IFFT section 216. Here, when there is no response signal to be transmitted through the sub frame having received the SR from the uplink data generating section (that is, when the downlink assignment control information is not detected at all), control section 208 instructs response signal generating section 212 to output "NACK" to modulating section 213. Further, control section 208 outputs a Walsh sequence and a DFT sequence corresponding to the PUCCH resources to be used to secondary spreading section 215. The details of control on the PUCCH resource and the phase points by control section 208 will be described later.

Demodulating section 209 demodulates the downlink data received from extracting section 204, and outputs the demodulated downlink data to decoding section 210.

Decoding section 210 decodes the downlink data received from demodulating section 209, and outputs the decoded downlink data to CRC section 211.

CRC section 211 generates the decoded downlink data received from decoding section 210, and performs error detection for each downlink unit band using a CRC. Then, CRC section 211 outputs ACK to control section 208 when CRC=OK (no error), but outputs NACK to control section 208 when CRC=NG (error). Further, when CRC=OK (no error), CRC section 211 outputs the decoded downlink data as received data.

Response signal generating section 212 generates the response signal and the reference signal based on the phase point of the response signal instructed from control section 208, and outputs the response signal and the reference signal to modulating section 213.

Modulating section 213 modulates the response signal and the reference signal input from response signal generating section 212, and outputs the modulated response signal and the modulated reference signal to primary spreading section 214.

Primary spreading section 214 performs primary-spreading on the response signal and the reference signal based on the ZAC sequence and the cyclic shift index set by control section 208, and outputs the primary-spread response signal and the primary-spread reference signal to secondary spreading section 215. That is, primary spreading section 214 performs primary-spreading on the response signal and the reference signal according to an instruction from control section 208. Here, "spreading" specifically means multiplying the response signal represented by information of one symbol by the ZAC sequence.

Secondary spreading section 215 performs secondary-spreading on the response signal and the reference signal using a Walsh sequence and a DFT sequence set by control section 208, and outputs the secondary-spread signal to IFFT section 216. That is, secondary-spreading section 215 performs secondary-spreading on the primary-spread response signal and the primary-spread reference signal using the Walsh sequence and the DFT sequence corresponding to the PUCCH resources selected by control section 208, and outputs the spread signal to IFFT section 216. That is, secondary spreading section 215 multiplies the response signal and the reference signal which have been subjected to primary spreading by a component of the Walsh sequence or a component of the DFT sequence.

CP adding section 217 adds the same signal as the tail part of the signal which has been subjected to IFFT, to the head of the signal as a CP.

Radio transmitting section 218 performs transmission processing, such as a D/A conversion process, an amplification process, and an up-conversion process, on the input signal. Then, radio transmitting section 218 transmits the signal to base station 100 through the antenna.

[Operation of Terminal 200]

An operation of terminal 200 having the above configuration will be described.

<Reception of Downlink Assignment Control Information and Downlink Data by Terminal 200>

Terminal 200 makes a blind decision as to whether or not downlink assignment control information addressed to its own terminal has been transmitted for each sub frame in all downlink unit bands of a unit band group set to its own terminal.

Specifically, deciding section 207 decides whether or not the downlink assignment control information addressed to its own terminal is included in the downlink control channel of each downlink unit band. Then, when it is decided that the downlink assignment control information addressed to its own terminal is included, deciding section 207 outputs the downlink assignment control information to extracting section 204. Further, deciding section 207 outputs the identification information of the downlink unit band in which the downlink assignment control information addressed to its own terminal has been detected, to control section 208. Thus, control section 208 is notified of the downlink unit band in which the downlink assignment control information addressed to its own terminal has been detected.

Extracting section 204 extracts downlink data from the received signal based on the downlink assignment control information received from deciding section 207. Extracting section 204 extracts the downlink data from the received signal based on the resource information included in the downlink assignment control information.

For example, downlink assignment control information transmitted at downlink unit band 1 includes information related to a resource used for transmission of downlink data (DL data) transmitted at downlink unit band 1, and downlink assignment control information transmitted at downlink unit band 2 includes information related to a resource used for transmission of downlink data transmitted at downlink unit band 2.

Thus, terminal 200 can receive downlink data at both downlink unit band 1 and downlink unit band 2 by receiving the downlink assignment control information transmitted at downlink unit band 1 and the downlink assignment control information transmitted at downlink unit band 2. On the other hand, when the terminal is difficult to receive the downlink assignment control information at a certain downlink unit band, terminal 200 is difficult to receive downlink data at the corresponding downlink unit band.

<Transmission of Response and SR by Terminal 200>

CRC section 211 performs error detection on downlink data corresponding to the successfully received downlink assignment control information, and outputs an error detection result to control section 208.

Then, control section 208 performs transmission control of the response signal as follows, based on the generation status of the SR received from the uplink data generating section (not illustrated) and the error detection result received from CRC section 211. FIGS. 8 and 9 are diagrams for describing a method of transmitting an SR and a response signal through terminal 200 when two downlink unit bands are set to terminal 200. FIGS. 10 and 11 are diagrams for describing a method of transmitting an SR and a response signal through terminal 200 when three downlink unit bands are set to terminal 200.

<Transmission of Response and SR by Terminal 200: When there are Two Downlink Unit Bands>

A description will be made below in connection with an example in which two downlink unit bands (downlink unit bands 1 and 2) are set to terminal 200. Here, an ACK/NACK resource (PUCCH resource) associated with a downlink control information assignment resource used for downlink assignment control information for downlink data transmitted in downlink unit band 1 is defined as ACK/NACK resource 1. Further, an ACK/NACK resource (PUCCH resource) associated with a downlink control information assignment resource used for downlink assignment control information for downlink data transmitted in downlink unit band 2 is defined as ACK/NACK resource 2.

Figure 4:
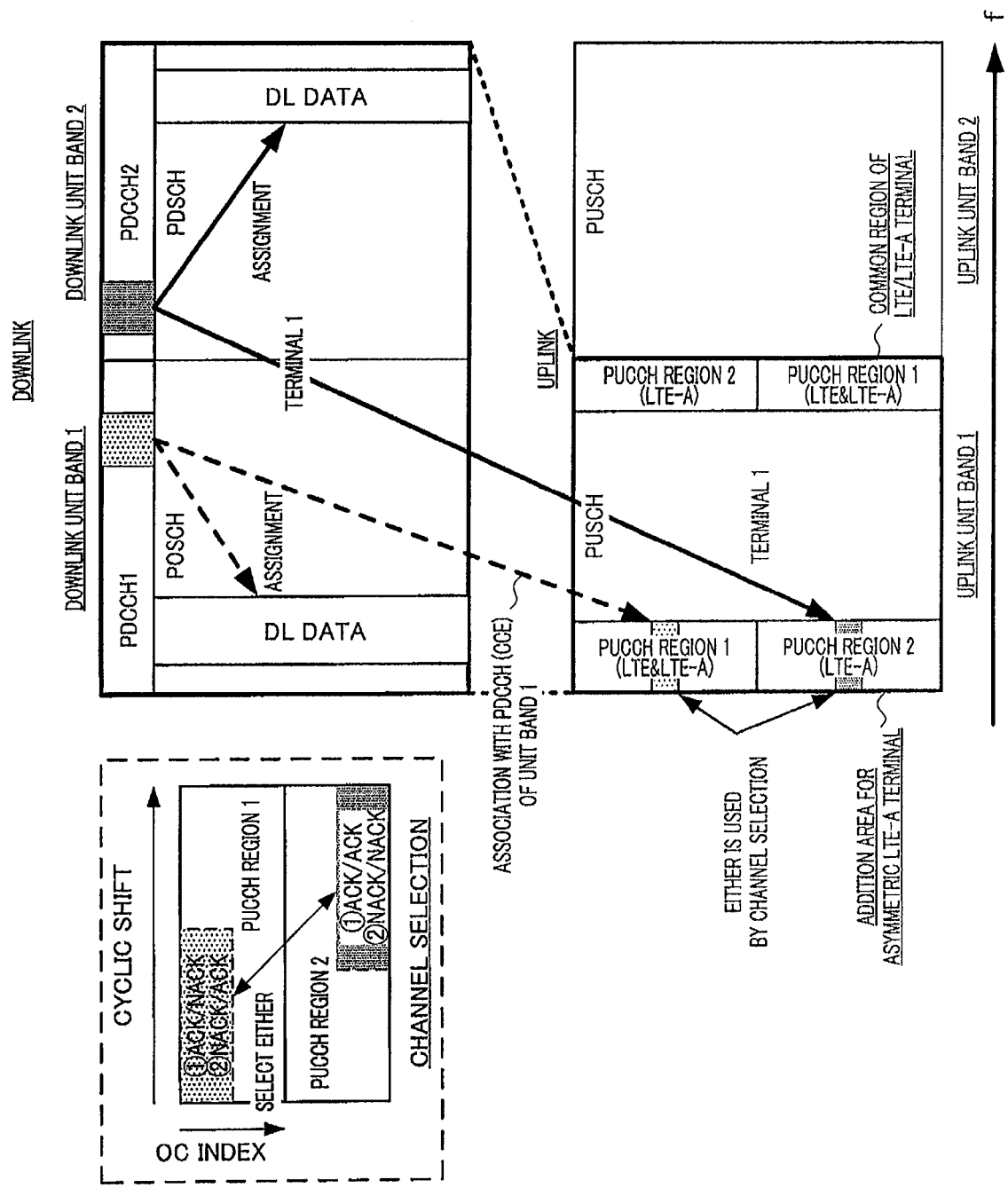
FIG. 4 is a diagram for describing ARQ control when carrier aggregation is applied to a terminal.

Further, in the following description, base station 100 independently notifies terminal 200 of information related to a resource (an SR resource illustrated in FIG. 8A) for transmitting an SR in an uplink unit band illustrated in FIG. 4 (an uplink unit band set to terminal 200). That is, control section 208 of terminal 200 retains information related to an SR resource notified from base station 100 through a separate signaling unit (for example, higher layer signaling).

Further, terminal 200 specifies an ACK/NACK resource associated with a CCE, which is occupied by downlink assignment control information received by its own terminal, among a plurality of CCEs configuring PDCCHs of downlink unit bands 1 and 2, as ACK/NACK resource 1 or 2.

Figure 8A:
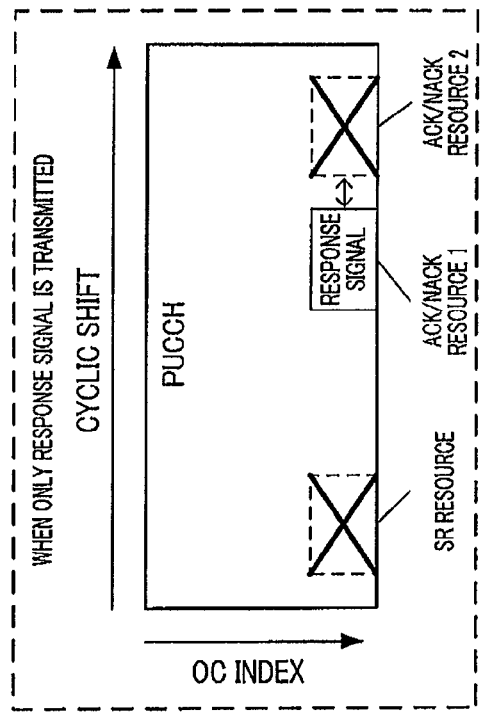
FIGS. 8A to 8D are diagrams for describing a method of transmitting an SR and a response signal by a terminal according to Embodiment 1 of the present invention (when two downlink unit bands are set to a terminal)

Here, in FIG. 8A, an SR resource and ACK/NACK resources 1 and 2 are different code resources from each other that at least one of a ZAC sequence (primary spreading) or a Walsh sequence/DFT sequence is different.

Figure 8B:
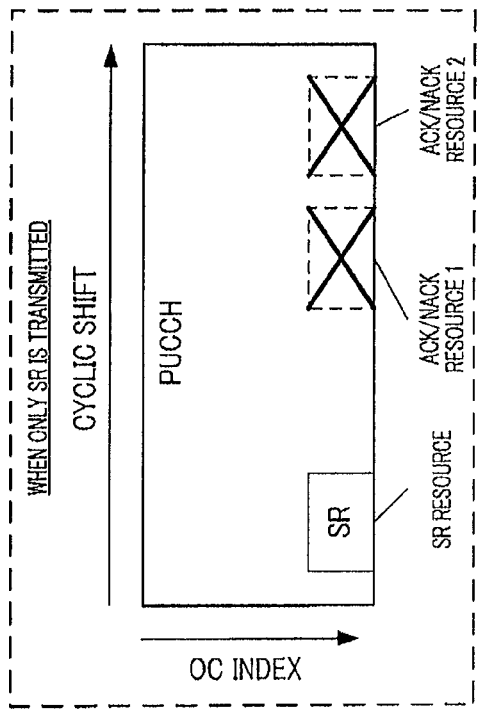

An operation of terminal 200 at this time is described in detail with reference to FIGS. 9A and 9B. Here, ACK/NACK resources 1 and 2 illustrated in FIG. 9A and an SR resource illustrated in FIG. 9B correspond to ACK/NACK resources 1 and 2 and an SR resource illustrated in FIGS. 8A to 8D, respectively. Further, in FIGS. 9A and 9B, "A" represents ACK, "N" represents NACK, and "D" represents DTX. In FIGS. 9A and 9B, for example, "A/N" represents a state in which a response signal corresponding to downlink unit band 1 (CC1) is ACK but a response signal corresponding to downlink unit band 2 (CC2) is NACK. Further, "N/D" represents a state in which a response signal corresponding to downlink unit band 1 (CC1) is NACK and it was difficult to detect downlink assignment control information corresponding to downlink data transmitted in downlink unit band 2 (CC2) (that is, DTX corresponding to downlink unit band 2 (CC2)). Further, in FIG. 9B, for example, "SR+A/N" represents a state in which "A/N" is transmitted using an SR resource. At this time, base station 100 detects an SR from terminal 200 side based on whether or not the SR resource is being used, and determines that a response signal is "A/N" based on a phase point to which the signal is mapped.

First, when terminal 200 transmits only the response signal ("when only response signal is transmitted" illustrated in FIG. 8B), terminal 200 performs an operation of the channel selection using ACK/NACK resources 1 and 2 associated with CCEs occupied by downlink assignment control information corresponding to downlink data transmitted in downlink unit bands 1 and 2 as illustrated in FIG. 9A. Specifically, control section 208 of terminal 200 transmits the response signal using a transmission rule (a mapping rule) of the response signal illustrated in FIG. 9A, based on a pattern (state) as to whether or not downlink data addressed to its own terminal, which correspond to downlink assignment control information and have been transmitted in downlink unit bands 1 and 2, have been successfully received (error detection result).

Here, it should be noted that states (D/A and D/N) in which DTX has been generated for downlink unit band 1 (CC1) are all notified by the phase point of ACK/NACK resource 2 other than ACK/NACK resource 1 illustrated in FIG. 9A. This is because when terminal 200 did not detect downlink assignment control information corresponding to downlink data in downlink unit band 1 (that is, in case of DTX), it is difficult to specify ACK/NACK resource 1 to be used at terminal 200 side. Similarly, states (A/D and N/D) in which DTX has been generated on downlink unit band 2 (CC2) are all notified by the phase point of ACK/NACK resource 1, not by ACK/NACK resource 2 illustrated in FIG. 9A. This is because when terminal 200 did not detect downlink assignment control information corresponding to downlink data in downlink unit band 2 (that is, in case of DTX), it is difficult to specify ACK/NACK resource 2 to be used at terminal 200 side. As described above, in the ACK/NACK resource, there is a limitation to a resource which can be used to notify a state in which DTX has been generated.

In FIG. 9A, if all of three states (N/D, D/N, and N/N) in which all is NACK or DTX can be notified through the same resource and at the same phase point, a total of four phase points become necessary to notify all states (8 states illustrated in FIG. 9A (a total of 8 reception success/failure patterns). That is, any one of the two ACK/NACK resources illustrated in FIG. 9A may be reduced. However, due to the limitation of the ACK/NACK resource, when terminal 200 transmits only the response signal as illustrated in FIG. 8B, two ACK/NACK resources 1 and 2 (that is, resources the number of which is equal to the number of downlink unit bands set to terminal 200) become necessary.

Figure 8C:
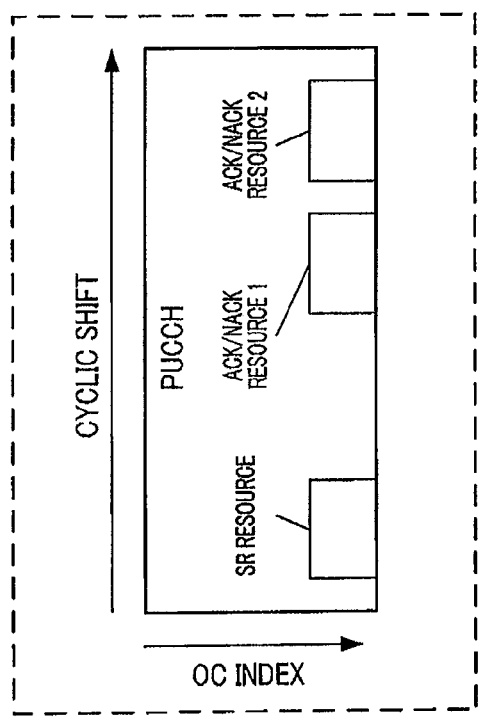
Figure 8D:
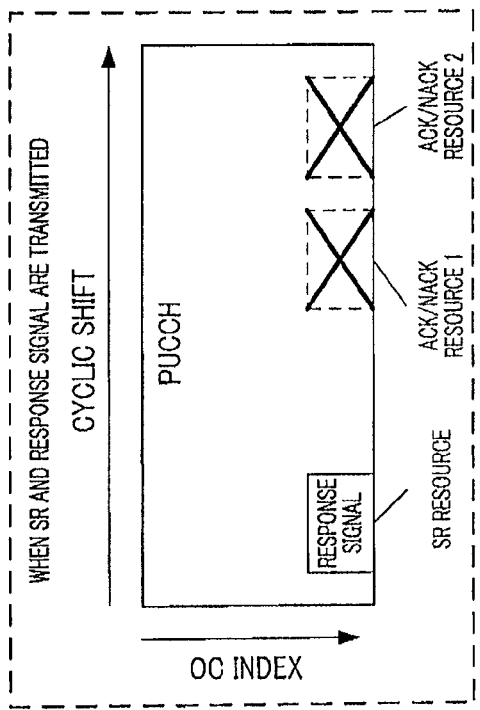
Figure 9A:
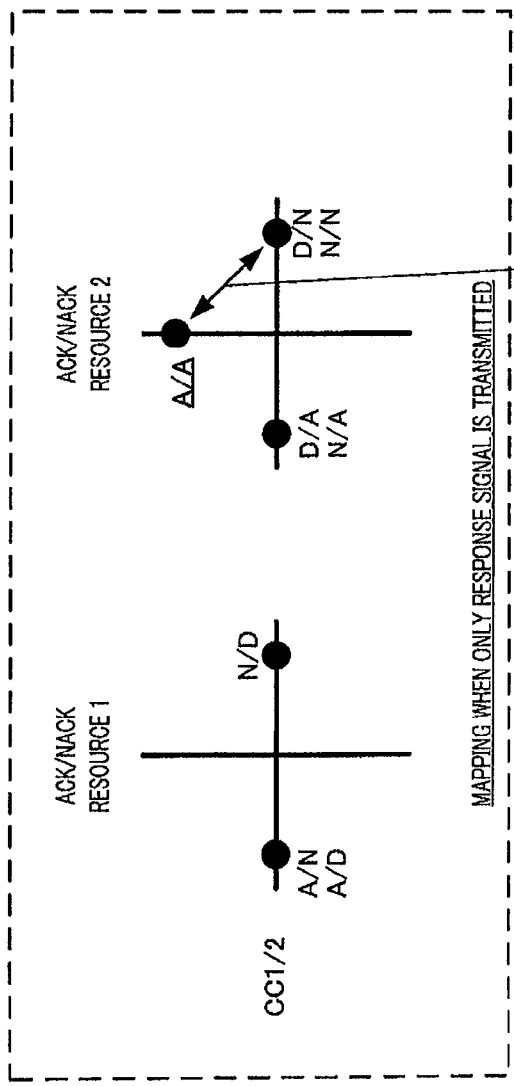
FIGS. 9A and 9B are diagrams for describing mapping of a response signal in an ACK/NACK resource and an SR resource according to Embodiment 1 of the present invention (when two downlink unit bands are set to a terminal)
Figure 9B:
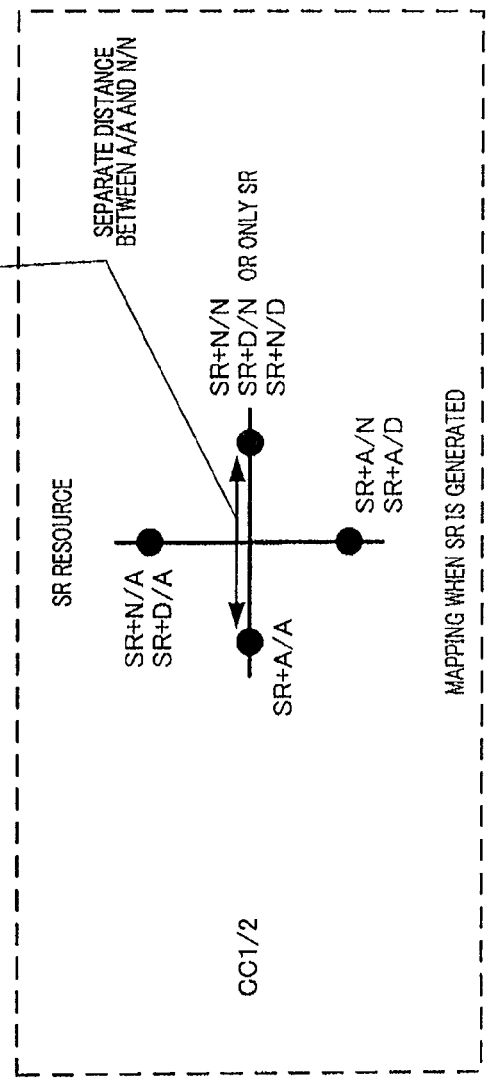

On the other hand, when terminal 200 simultaneously transmits the SR and the response signal in the same sub frame ("when SR and response signal are transmitted" illustrated in FIG. 8C), terminal 200 transmits the response signal using the SR resource notified from base station 100 by a separate signaling technique as illustrated in FIG. 9B. Specifically, control section 208 of terminal 200 transmits the response signal using the transmission rule (the mapping rule) of the response signal illustrated in FIG. 9B based on the pattern (state) as to whether or not downlink data corresponding to downlink assignment control information addressed to its own terminal has been successfully received (error detection result).

Here, a description will be made in connection with the transmission rule (mapping rule) (FIG. 9B) of the response signal used when the SR and the response signal have been simultaneously generated in the same sub frame ("when SR and response signal are transmitted" illustrated in FIG. 8C).

In FIG. 9B, when all of two pieces of downlink assignment control information and downlink data transmitted in downlink unit bands 1 and 2 corresponding to the respective downlink assignment control information have been successfully received, a phase point (−1, 0) is used. That is, in FIG. 9B, "A/A" is associated with the phase point (−1, 0) of the SR resource.

Further, when, of downlink data of downlink unit bands 1 and 2 corresponding to the two pieces of downlink assignment control information, downlink data of downlink unit band 1 has been successfully received but downlink data of downlink unit band 2 has been failed in reception, a phase point of (0, −j) is used. That is, in FIG. 9B, "A/N" and "A/D" are associated with the phase point (0, −j) of the SR resource.

Further, when, of downlink data of downlink unit bands 1 and 2 corresponding to the two pieces of downlink assignment control information, downlink data of downlink unit band 1 has been failed in reception but downlink data of downlink unit band 2 has been successfully received, a phase point of (0, j) is used. That is, in FIG. 9B, "N/A" and "D/A" are associated with the phase point (0, j) of the SR resource.

Further, when none of downlink data of downlink unit bands 1 and 2 corresponding to the two pieces of downlink assignment control information have been received, a phase point of (1, 0) is used. That is, in FIG. 9B, "N/N", "D/N", and "N/D" are associated with the phase point (1, 0) of the SR resource.

That is, in the transmission rule (mapping rule) illustrated in FIG. 9B (when the SR and the response signal have been simultaneously generated in the same sub frame), a reception success/failure (error detection result) pattern candidate is associated with the phase point of the response signal in the SR resource, and different phase points in the SR resource are associated with pattern candidate groups which differ in at least one of the number of ACKs included in the pattern and the position of ACK (that is, the downlink unit band to which successfully received downlink data is assigned) in the pattern. That is, in FIG. 9B, the reception success/failure (error detection result) pattern candidate is associated with the phase point of the response signal in the SR resource, different phase points in the SR resource are associated with pattern candidate groups which differ in the number of ACKs included in the pattern, and different phase points in the SR resource are associated with pattern candidate groups which are equal in the number of ACKs included in the pattern but differ in the position of ACK (that is, the downlink unit band to which successfully received downlink data is assigned) in the pattern. Thus, even in the case in which all downlink data corresponding to the detected downlink assignment control information have been successfully received, when the number of successfully received downlink data (the number of ACKs) is different or when the downlink unit band to which successfully received downlink data has been assigned (the position of ACK) is different even though the number of successfully received downlink data (the number of ACKs) is the same, different phase points in the SR resource are used for the response signal.

For example, in FIG. 9B, when downlink data has been successfully received in all of downlink unit bands ("A/A"), the phase point (−1, 0) is used. Further, when downlink data has been successfully received in downlink unit band 1 but downlink data has failed in reception in downlink unit band 2 ("A/N" and "A/D"), the phase point (0, −j) is used. Further, when downlink data has failed in reception in downlink unit band 1 but downlink data has been successfully received in downlink unit band 2 ("N/A" and "D/A"), the phase point (0, j) is used. Further, when downlink data has not been received in all of downlink unit bands ("N/N", "D/N", and "N/D"), the phase point (−1, 0) is used.

Here, the SR resource illustrated in FIG. 9B is notified by a separate signaling technique (for example, higher layer signaling) from base station 100 to terminal 200. Thus, in FIG. 9B ("when SR and response signal are transmitted" illustrated in FIG. 8C), there is no limitation as in FIG. 9A ("when only response signal is transmitted" illustrated in FIG. 8B), and all of the three states "N/D", "D/N", and "N/N" can be associated with the same resource and the same phase point (here, the phase point (1, 0)). Thus, in FIG. 9B, a total of 4 phase points are necessary for notifying all states (a total of 8 states illustrated in FIG. 9B (8 reception success/failure patterns)).

That is, in FIG. 9A, due to the limitation, a total of 5 phase points are necessary for notifying all states (reception success/failure patterns), and two ACK/NACK resources are necessary for notifying the response signals of downlink unit bands 1 and 2. On the other hand, in FIG. 9B, a single SR resource (PUCCH resource) may be used to simultaneously notify the SR and the response signals of downlink unit bands 1 and 2.

Figure 5B:
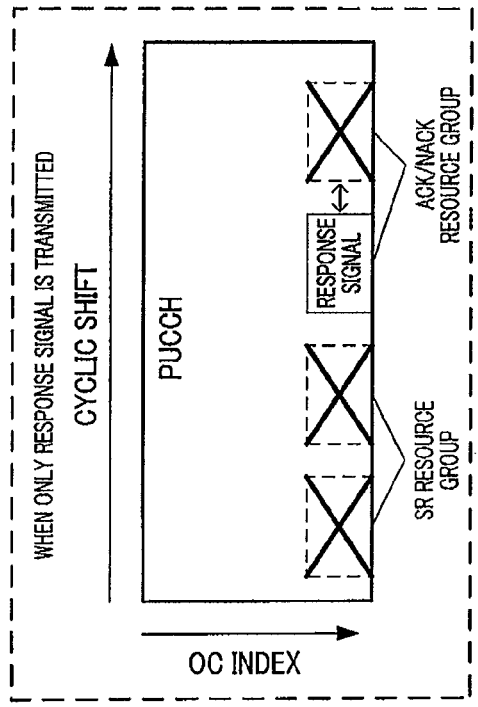
FIGS. 5A to 5D are diagrams for describing a method of transmitting an SR and a response signal by a terminal when channel selection is applied as a method of transmitting a response signal, upon carrier performing aggregation communication using a plurality of downlink unit bands.
Figure 5D:
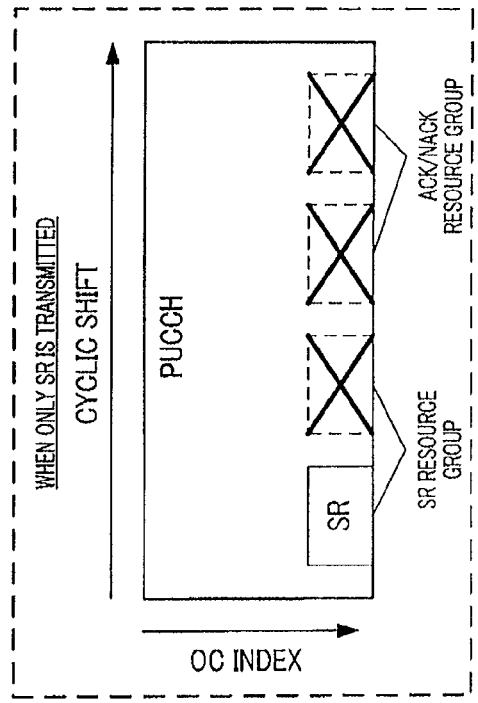
Figure 5A:
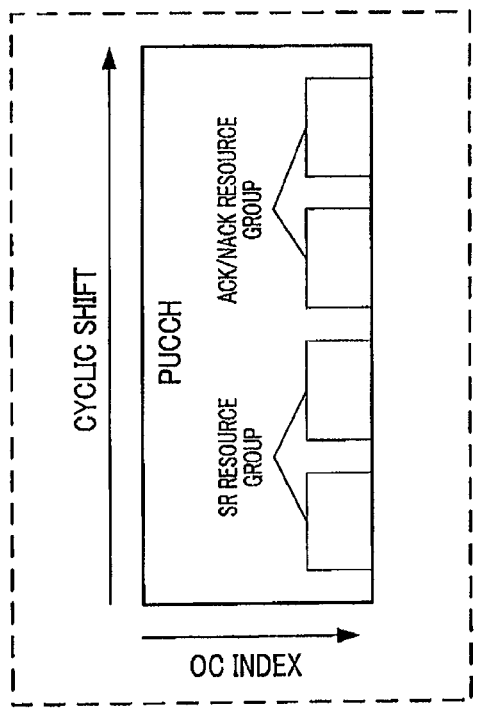
Figure 5C:
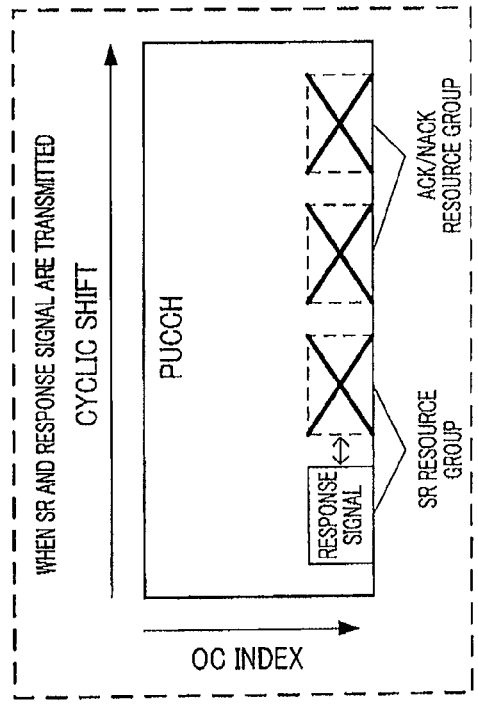

As described above, when terminal 200 simultaneously transmits the SR and the response signal, mapping illustrated in FIG. 9B is used. Thus, even when the channel selection is applied as a method of transmitting the response signal, the number of SR resources can be reduced. For example, when FIG. 5A is compared with FIG. 8A, four PUCCH resources (SR resources and ACK/NACK resources) are necessary in FIG. 5A, whereas three PUCCH resources (SR resources and ACK/NACK resources) are necessary in FIG. 8A. That is, in FIG. 8A, one PUCCH resource is deleted compared to FIG. 5A, thus an increase in the overhead of the uplink control channel (PUCCH) can be suppressed.

In FIG. 9B, it should be noted that a case ("A/A" illustrated in FIG. 9B) in which all response signals to downlink unit bands 1 and 2 at terminal 200 side are ACK and cases ("N/N", "D/N", and "N/D" illustrated in FIG. 9B) in which all response signals to downlink unit bands 1 and 2 at terminal 200 side are NACK or DTX are associated with phase points farthest from each other, among phase points (4 phase points) which can be selected by the reception success/failure (error detection result) pattern candidate group.

That is, in FIG. 9B, the states (the reception success/failure pattern candidate group) of the response signals notified using adjacent phase points (that is, phase points having a phase difference of 90° (π/2 radians)) in the SR resource are different from each other only in the reception status in one downlink unit band. For example, in the SR resource illustrated in FIG. 9B, the state "A/A" notified using the phase point (−1, 0) and the states "N/A" and "D/A" notified using the phase point (0, j) (having a phase difference of 90° with the phase point (−1, 0)) are different from each other only in the reception status of downlink unit band 1 (CC1). Similarly, in the SR resource illustrated in FIG. 9B, the state "A/A" notified using the phase point (−1, 0) and the states "A/N" and "A/D" notified using the phase point (0, −j) (having a phase difference of 90° with the phase point (−1, 0)) are different from each other only in the reception status of downlink unit band 2 (CC2). This is similarly applied to the other phase points.

As a result, even when the phase point is erroneously decided, base station 100 side (deciding section 118) can suppress the number of unit bands erroneous in a retransmission control to a minimum, thereby minimizing degradation in retransmission efficiency.

Further, when terminal 200 transmits only the SR ("when only SR is transmitted" illustrated in FIG. 8D), terminal 200 transmits the SR using the SR resource separately notified from base station 100 as illustrated in FIG. 9B. At this time, control section 208 of terminal 200 transmits the SR using the same phase point (1, 0) as the state (the reception success/failure pattern) in which all is NACK (or DTX), which is illustrated in FIG. 9B.

<Transmission of Response and SR by Terminal 200: When there are Three Downlink Unit Bands>

The following description will be made in connection with an example in which three downlink unit bands (downlink unit bands 1, 2, and 3) are set to terminal 200. Here, an ACK/NACK resource (PUCCH resource) associated with a downlink control information assignment resource used for downlink assignment control information for downlink data transmitted in downlink unit band 1 is defined as ACK/NACK resource 1. Further, an ACK/NACK resource (PUCCH resource) associated with a downlink control information assignment resource used for downlink assignment control information for downlink data transmitted at downlink unit band 2 is defined as ACK/NACK resource 2. Further, an ACK/NACK resource (PUCCH resource) associated with a downlink control information assignment resource used for downlink assignment control information for downlink data transmitted at downlink unit band 3 is defined as ACK/NACK resource 3.

Further, in the following description, base station 100 separately notifies terminal 200 of information related to two resources (SR resources 1 and 2 illustrated in FIG. 10A) for transmitting an SR in an uplink unit band illustrated in FIG. 4 (an uplink unit band set to terminal 200). That is, control section 208 of terminal 200 retains information related to SR resources 1 and 2 notified from base station 100.

Further, terminal 200 specifies an ACK/NACK resource associated with a CCE, which is occupied by downlink assignment control information received by its own terminal, among a plurality of CCEs configuring PDCCHs of downlink unit bands 1, 2, and 3 as ACK/NACK resource 1, 2, or 3.

Here, in FIG. 10A, SR resources 1 and 2 and ACK/NACK resources 1, 2, and 3 are different code resources from each other such that at least one of a ZAC sequence (primary spreading) or a Walsh sequence/DFT sequence is different.

Figures 11A, 11B:
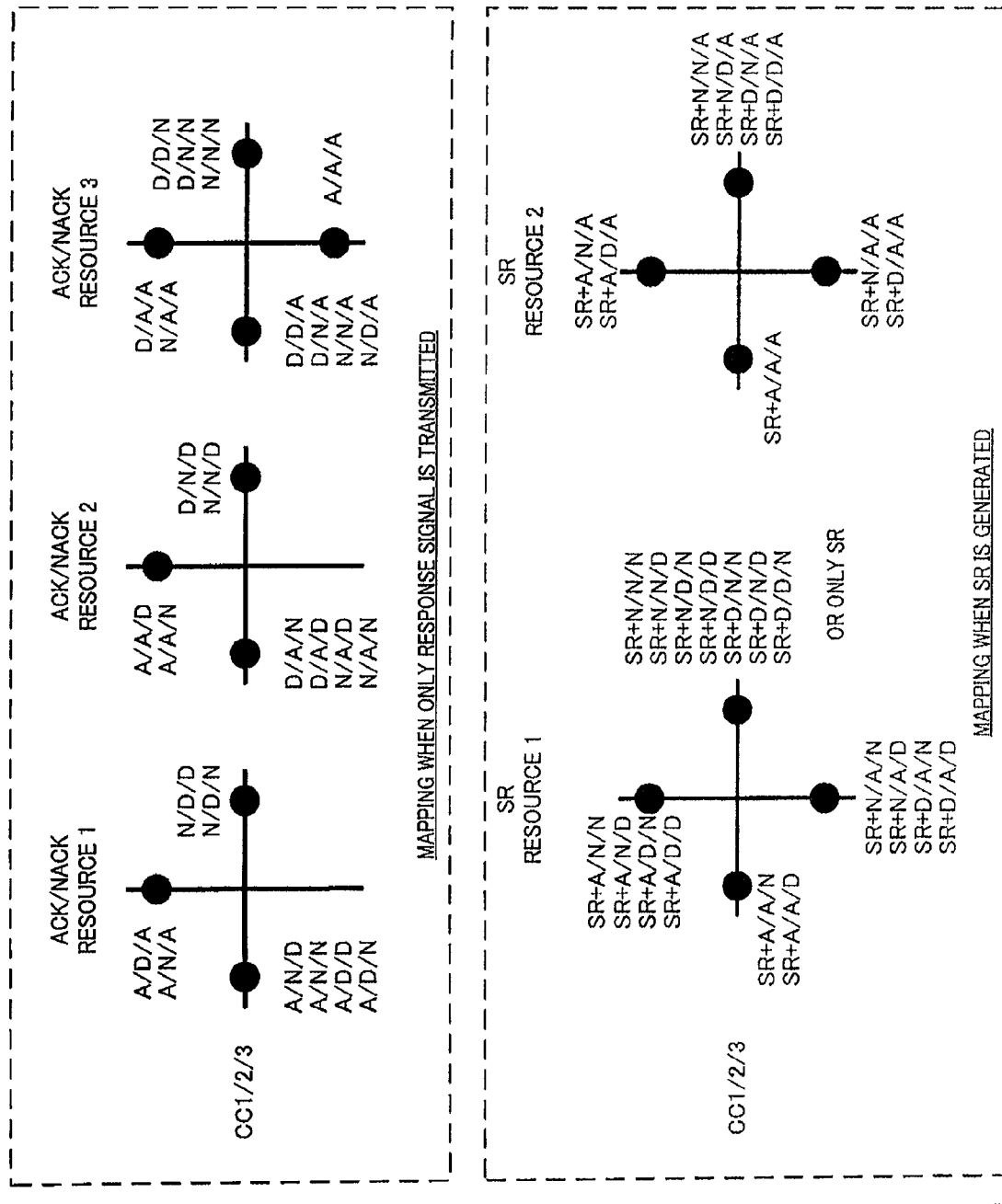
FIGS. 11A and 11B are diagrams for describing mapping of a response signal in an ACK/NACK resource and an SR resource according to Embodiment 1 of the present invention (when three downlink unit bands are set to a terminal)

An operation of terminal 200 at this time is described in detail with reference to FIGS. 11A and 11B. Here, ACK/NACK resources 1, 2, and 3 illustrated in FIG. 11A and SR resources 1 and 2 illustrated in FIG. 11B correspond to ACK/NACK resources 1, 2, and 3 and SR resources 1 and 2 illustrated in FIGS. 10A to 10D, respectively. In FIGS. 11A and 11B, for example, "A/N/N" represents a state in which a response signal corresponding to downlink unit band 1 (CC1) is ACK but response signals corresponding to downlink unit band 2 (CC2) and downlink unit band 3 (CC3) are NACK. Further, "N/D/D" represents a state in which a response signal corresponding to downlink unit band 1 (CC1) is NACK and it was difficult to detect downlink assignment control information corresponding to downlink data transmitted in downlink unit band 2 (CC2) and downlink unit band 3 (CC3) (that is, DTXs corresponding to downlink unit band 2 (CC2) and downlink unit band 3 (CC3)). Further, in FIG. 11B, for example, "SR+A/N/N" represents a state in which "A/N/N" is transmitted using an SR resource.

First, when terminal 200 transmits only the response signal ("when only response signal is transmitted" illustrated in FIG. 10B), terminal 200 performs an operation of the channel selection using ACK/NACK resources 1, 2, and 3 associated with CCEs occupied by downlink assignment control information corresponding to downlink data transmitted in downlink unit bands 1, 2, and 3 as illustrated in FIG. 11A. Specifically, control section 208 of terminal 200 transmits the response signal using a transmission rule (a mapping rule) of the response signal illustrated in FIG. 11A based on a pattern (state) as to whether or not downlink data associated with downlink assignment control information corresponding to downlink data addressed to its own terminal, which have been transmitted in downlink unit bands 1, 2, and 3, have been successfully received (error detection result).

Here, it should be noted that states (D/D/A and D/D/N) in which DTXs have been generated for downlink unit band 1 (CC1) and downlink unit band 2 (CC2) are all notified by the phase point of ACK/NACK resource 3, not by ACK/NACK resources 1 and 2 illustrated in FIG. 11A. This is because when terminal 200 did not detect downlink assignment control information corresponding to downlink data transmitted in downlink unit bands 1 and 2 (that is, in case of DTX), it is difficult to specify ACK/NACK resources 1 and 2 to be used at terminal 200 side. Similarly, states (A/D/D and N/D/D) in which DTXs have been generated for downlink unit band 2 (CC2) and downlink unit band 3 (CC3) are all notified by the phase point of ACK/NACK resource 1. States (D/A/D and D/N/D) in which DTXs have been generated for downlink unit band 1 (CC1) and downlink unit band 3 (CC3) are all notified by the phase point of ACK/NACK resource 2. Further, a state in which DTX has been generated for downlink unit band 1 is notified by phase points of ACK/NACK resources 2 and 3 other than ACK/NACK resource 1 illustrated in FIG. 11A. It is similarly applied to a state in which DTX has been generated for downlink unit bands 2 and 3. As described above, in the ACK/NACK resource, there is a limitation to a resource which can be used to notify a state in which DTX has been generated.

In FIG. 11A, if all of seven states ("N/N/N", "N/N/D", "N/D/N", "N/D/D", "D/N/N", and "D/N/D") in which all is NACK or DTX can be notified through the same resource and at the same phase point, a total of 8 phase points are necessary to notify all states (a total of 26 states illustrated in FIG. 11A (26 reception success/failure patterns)). That is, it is possible to reduce any one of the three ACK/NACK resources illustrated in FIG. 11A. However, due to the limitation of the ACK/NACK resource, when terminal 200 transmits only the response signal as illustrated in FIG. 10B, three ACK/NACK resources 1, 2, and 3 (that is, resources of which the number is equal to that of downlink unit bands set to terminal 200) are necessary.

On the other hand, when terminal 200 simultaneously transmits the SR and the response signal in the same sub frame ("when SR and response signal are transmitted" illustrated in FIG. 10C), terminal 200 transmits the response signal using the SR resource separately notified from base station 100 as illustrated in FIG. 11B. Specifically, control section 208 of terminal 200 transmits the response signal using the transmission rule (the mapping rule) of the response signal illustrated in FIG. 11B, based on the pattern (state) as to whether or not downlink data corresponding to downlink assignment control information addressed to its own terminal has been successfully received (error detection result).

Here, a description will be made in connection with the transmission rule (mapping rule) (FIG. 11B) of the response signal used when the SR and the response signal have been simultaneously generated in the same sub frame ("when SR and response signal are transmitted" illustrated in FIG. 10C).

In the transmission rule (mapping rule) illustrated in FIG. 11B (when the SR and the response signal have been simultaneously generated in the same sub frame), a reception success/failure (error detection result) pattern candidate is associated with the SR resource to which the response signal is assigned and the phase point of the response signal, and SR resources and phase points which differ in at least one of the SR resource and the phase point are associated with pattern candidate groups which differ in at least one of the number of ACKs included in the pattern and the position of ACK (that is, the downlink unit band to which successfully received downlink data is assigned) in the pattern. That is, in FIG. 11B, the reception success/failure (error detection result) pattern candidate is associated with a pair of the SR resource and the phase point of the response signal, different pairs (pairs of the SR resources and the phase points) are associated with pattern candidate groups which differ in the number of ACKs included in the pattern, and different pairs (pairs of the SR resources and the phase points) are associated with pattern candidate groups which are equal in the number of ACKs included in the pattern but differ in the position of ACK (that is, the downlink unit band to which successfully received downlink data is assigned) in the pattern. Thus, even in the case in which all downlink data corresponding to the detected downlink assignment control information have been successfully received, when the number of successfully received downlink data (the number of ACKs) is different or when the downlink unit band to which successfully received downlink data has been assigned (the position of ACK) is different even though the number of successfully received downlink data (the number of ACKs) is the same, different SR resources and different phase points are used for the response signal.

For example, in FIG. 11B, when downlink data has been successfully received in all of downlink unit bands ("A/A/A"), the phase point (−1, 0) of SR resource 2 is used. Further, when downlink data has been successfully received in downlink unit bands 1 and 2 but downlink data has not been received in downlink unit band 3 ("A/A/N" and "A/A/D"), the phase point (−1, 0) of SR resource 1 is used. Further, when downlink data has been successfully received in downlink unit bands 1 and 3 but downlink data has not been successfully received in downlink unit band 2 ("A/N/A" and "A/D/A"), the phase point (0, j) of SR resource 2 is used. Further, when downlink data has been successfully received in downlink unit band 1 but downlink data has not been received in downlink unit bands 2 and 3 ("A/N/N", "A/N/D", "A/D/N", and "A/D/D"), the phase point (0, j) of SR resource 1 is used. Further, when downlink data has not been received in downlink unit band 1 but downlink data has been successfully received in downlink unit bands 2 and 3 ("N/A/A" and "D/A/A"), the phase point (0, −j) of SR resource 2 is used. Further, when downlink data has not been received in downlink unit bands 1 and 3 but downlink data has been successfully received in downlink unit band 2 ("N/A/N", "N/A/D", "D/A/N", and "D/A/D"), the phase point (0, −j) of SR resource 1 is used. Further, when downlink data has not been received in downlink unit bands 1 and 2 but downlink data has been successfully received in downlink unit band 3 ("N/N/A", "N/D/A", "D/N/A", and "D/D/A"), the phase point (1, 0) of SR resource 2 is used. Further, when downlink data has not been received in all of downlink unit bands ("N/N/N", "N/N/D", "N/D/N", "N/D/D", "D/N/N", "D/N/D", and "D/DN"), the phase point (1, 0) of SR resource 1 is used.

Here, the SR resource illustrated in FIG. 11B is notified from base station 100 to terminal 200 in advance, similarly to FIG. 9B. Thus, in FIG. 11B ("when SR and response signal are transmitted" illustrated in FIG. 10C), there is no limitation as in FIG. 11A ("when only response signal is transmitted" illustrated in FIG. 10B), and all of the seven states ("N/N/N", "N/N/D", "N/D/N", "N/D/D", "D/N/N", and "D/N/D") can be associated with the same resource and the same phase point (in FIG. 11B, the phase point (1, 0) of SR resource 1). Thus, in FIG. 11B, a total of 8 phase points are necessary for notifying all states (a total of 26 states illustrated in FIG. 11B (26 reception success/failure patterns)).

That is, in FIG. 11A, due to the limitation, a total of 10 phase points are necessary for notifying all states (reception success/failure patterns), and three ACK/NACK resources are necessary for notifying the response signals of downlink unit bands 1, 2, and 3. On the other hand, in FIG. 11B, two SR resources (PUCCH resources) may be used to notify the SR and the response signals of downlink unit bands 1, 2, and 3.

As described above, when terminal 200 simultaneously transmits the SR and the response signal, mapping illustrated in FIG. 11B is used. Thus, even when the channel selection is applied as a method of transmitting the response signal, the number of SR resources can be suppressed. In FIG. 10A, two SR resources, which are less by one resource than three ACK/NACK resources, are preferably prepared. That is, in FIG. 10A, five PUCCH resources (SR resources and ACK/NACK resources) are enough for transmitting the SR and the response signal.

In FIG. 11B, it should be noted that the states (the reception success/failure pattern candidate group) of the response signals notified using adjacent phase points (that is, phase points having a phase difference of 90° (π/2 radians)) in the same resource are different from each other only in the reception status in one downlink unit band. For example, in SR resource 2 illustrated in FIG. 11B, the state "A/A/A" notified using the phase point (−1, 0) and the states "A/N/A" and "A/D/A" notified using the phase point (0, j) (having a phase difference of 90° with respect to the phase point (−1, 0)) are different from each other only in the reception status of downlink unit band 2 (CC2). Similarly, in SR resource 2 illustrated in FIG. 11B, the state "A/A/A" notified using the phase point (−1, 0) and the states "N/A/A" and "D/A/A" notified using the phase point (0, −j) (having a phase difference of 90° with respect to the phase point (−1, 0)) are different from each other only in the reception status of downlink unit band 1 (CC1). This is similarly applied to the other phase points.

As a result, similarly to FIG. 9B, even when the phase point is erroneously decided, base station 100 side (deciding section 118) can suppress the number of unit bands having a retransmission control error to a minimum, thereby minimizing degradation in retransmission efficiency.

Further, when terminal 200 transmits only the SR ("when only SR is transmitted" illustrated in FIG. 10D), terminal 200 transmits the SR using the same resource (SR resource 1) and the same phase point (1, 0) as in the state (reception success/failure pattern) in which all is NACK (or DTX), as illustrated in FIG. 11B.

As described above, according to the present embodiment, control section 208 of terminal 200 performs transmission control of the SR and the response signal, based on the generation status of the SR and the pattern as to whether or not downlink data has been successfully received in the downlink unit band included in the unit band group set to its own terminal (error detection result). Further, when the SR and the response signal have been simultaneously generated in the same sub frame, control section 208 causes a pair of the PUCCH resource (SR resource) for notifying the response signal and the phase point of the response signal to be different according to the number of successfully received downlink data (that is, the number of ACKs) and the downlink unit band (that is, the position of ACK in the reception success/failure pattern) to which successfully received downlink data has been assigned in each reception success/failure (error detection result) pattern. That is, a pair of the PUCCH resource (SR resource) and the phase point of the response signal selected by terminal 200 differs according to the number of successfully received downlink data (that is, the number of ACKs) and the downlink unit band (that is, the position of ACK in the reception success/failure pattern) to which successfully received downlink data has been assigned in each reception success/failure pattern.

As a result, base station 100 which is a reception side of the response signal can specify a combination of downlink unit bands in which downlink data has been successfully received, based on the PUCCH resource through which the response signal has been received and the phase point of the response signal. Further, terminal 200 changes the PUCCH resource (the ACK/NACK resource or the SR resource) and the transmission rule (mapping rule) according to the generation status of the SR at terminal 200 side. At this time, when the SR and the response signal have been simultaneously generated in the same sub frame, terminal 200 notifies the response signal using all phase points (constellation points) of the SR resource. Thus, the number of SR resources necessary for notifying the SR and the response signal can be reduced. That is, the number of SR resources to be notified from base station 100 to terminal 200 can be reduced. As described above, according to the present embodiment, even when the channel selection is applied as a method of transmitting the response signal in the LTE-A, the amount of an increase in the overhead of the uplink control channel (PUCCH) can be suppressed, and the SR and the response signal can be simultaneously transmitted.

Embodiment 2

In Embodiment 2, the terminal cancels transmission of ACK information in some of downlink unit bands so as to further reduce the overhead of the uplink control channel (PUCCH) compared to Embodiment 1. That is, the terminal drops ACK information in some downlink unit bands. Thus, in Embodiment 2, the overhead of the uplink control channel (PUCCH) can be further reduced compared to Embodiment 1.

A concrete description will be made below. Basic configurations of the base station and the terminal according to Embodiment 2 are the same as in Embodiment 1, and thus a description will be made with reference to FIG. 6 (base station 100) and FIG. 7 (terminal 200).

[Operation of Terminal 200: When there are Three Downlink Unit Bands]

The following description will be made in connection with an example in which three downlink unit bands (downlink unit bands 1, 2, and 3) are set to terminal 200. Here, similarly to Embodiment 1, an ACK/NACK resource (PUCCH resource) associated with a downlink control information assignment resource used for downlink assignment control information for downlink data transmitted in downlink unit band 1 is defined as ACK/NACK resource 1. Further, an ACK/NACK resource (PUCCH resource) associated with a downlink control information assignment resource used for downlink assignment control information for downlink data transmitted in downlink unit band 2 is defined as ACK/NACK resource 2. Further, an ACK/NACK resource (PUCCH resource) associated with a downlink control information assignment resource used for downlink assignment control information for downlink data transmitted in downlink unit band 3 is defined as ACK/NACK resource 3.

Further, in the following description, base station 100 notifies terminal 200 of information related to one resource (an SR resource illustrated in FIG. 12A) for transmitting an SR in an uplink unit band set to terminal 200 by a separate signaling technique (for example, higher layer signaling). That is, control section 208 of terminal 200 retains information related to the SR resource notified from base station 100.

Further, terminal 200 specifies an ACK/NACK resource associated with a CCE, which is occupied by downlink assignment control information received by its own terminal, among a plurality of CCEs configuring PDCCHs of downlink unit bands 1, 2, and 3 as ACK/NACK resource 1, 2, or 3.

Figure 12A:
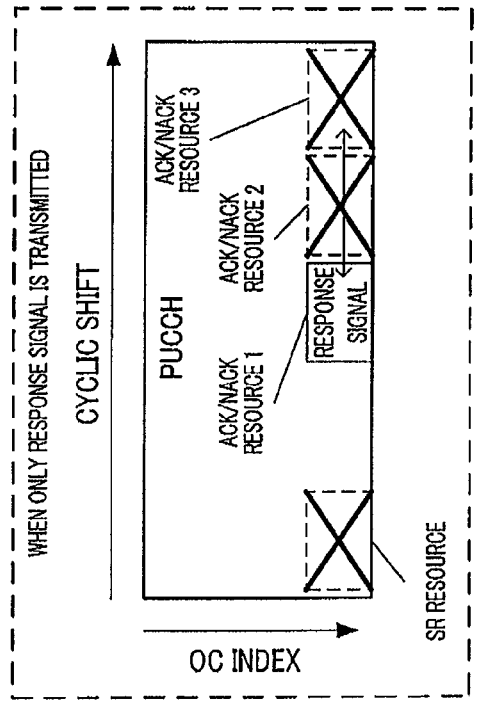
FIGS. 12A to 12D are diagrams for describing a method of transmitting an SR and a response signal by a terminal according to Embodiment 2 of the present invention.

Here, in FIG. 12A, an SR resource and ACK/NACK resources 1, 2, and 3 are different code resources from each other such that at least one of a ZAC sequence (primary spreading) or a Walsh sequence/DFT sequence is different.

Next, a description will be made in connection with mapping examples 1 to 4 of the response signal in terminal 200 for suppressing the number of SR resources to one, even when three downlink unit bands (downlink unit bands 1 to 3) are set to terminal 200.

Mapping Example 1

FIGS. 13A and 13B

Figure 12B:
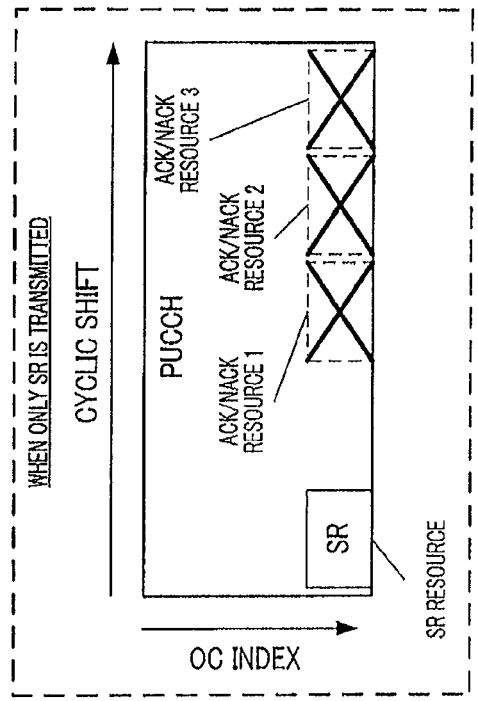
Figure 12C:
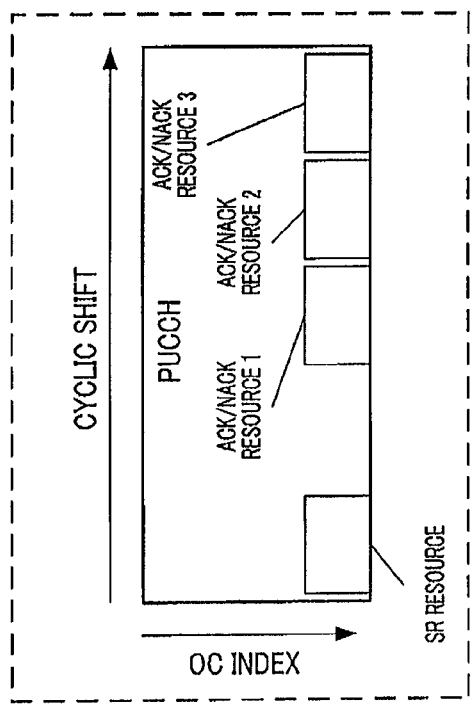

In mapping example 1, when the SR and the response signal are simultaneously transmitted ("when SR and response signal are transmitted" illustrated in FIG. 12C), terminal 200 decides a resource, to which the response signal is to be mapped, and a phase point according to an error detection result pattern on downlink unit band 1 (CC1) and downlink unit band 2 (CC2), regardless of whether or not downlink unit band 3 (CC3) is in a state of any one of ACK, NACK, and DTX. That is, terminal 200 uses the mapping rule (FIG. 9B) used when there are two downlink unit bands in Embodiment 1. Here, it is assumed that priorities, among downlink unit bands 1 to 3, which base station 100 uses to transmit downlink data, are set to be higher in ascending order of downlink unit bands 1, 2, and 3.

Specifically, when only the response signal is transmitted ("when only response signal is transmitted" illustrated in FIG. 12B), it is similar to Embodiment 1 (FIG. 11A) as illustrated in FIG. 13A.

On the other hand, when the SR and the response signal have been simultaneously generated ("when SR and response signal are transmitted" illustrated in FIG. 12C), reception success/failure (error detection result) pattern candidates of downlink unit band 1 (CC1) and downlink unit band 2 (CC2) are associated with a phase point of the response signal in the SR resource as illustrated in FIG. 13B. That is, in FIG. 13B, a resource for transmitting the response signal and a phase point are decided, regardless of the reception status of downlink unit band 3 (CC3) in terminal 200. That is, the response signal for downlink unit band 3 is not actually notified from terminal 200 to base station 100 and dropped. That is, downlink data transmitted from base station 100 to terminal 200 using downlink unit band 3 is necessarily re-transmitted.

However, it is rare for terminal 200 side to simultaneously generate the SR and the response signal in the same sub frame. Further, even though base station 100 has set three downlink unit bands for terminal 200, it is actually enough for base station 100 to transmit downlink data to terminal 200 using only one downlink unit band (for example, downlink unit band 1 having a highest priority) in most cases, and thus base station 100 needs not necessarily use downlink unit band 3. That is, there are few cases in which base station 100 has to transmit downlink data to the terminal using downlink unit band 3. When these are taken into consideration, a possibility that terminal 200 would not detect downlink assignment control information in downlink unit band 3 is high (that is, a possibility of DTX is high). Thus, as illustrated in FIG. 13B, even though terminal 200 does not transmit (drops) information related to the response signal for downlink unit band 3, retransmission efficiency is hardly affected.

Figure 12D:
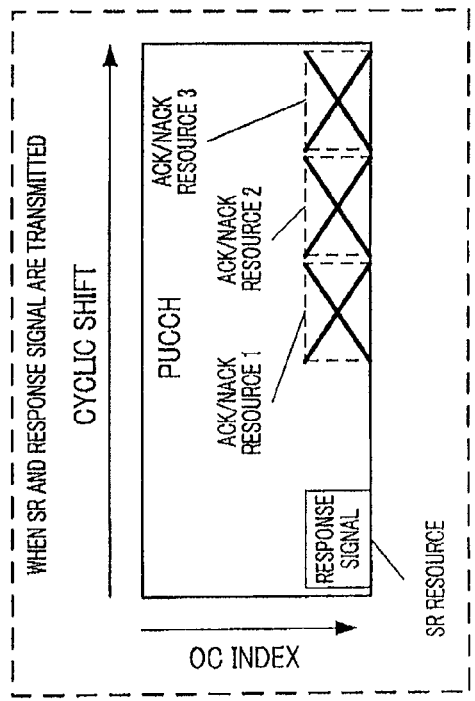

Further, when terminal 200 transmits only the SR ("when only SR is transmitted" illustrated in FIG. 12D), terminal 200 transmits the SR using the same phase point (1, 0) as in a state (reception success/failure pattern) in which all reception statuses for downlink unit bands 1 and 2 are NACK (or DTX) as illustrated in FIG. 13B.

Thus, in mapping example 1, only when the SR and the response signal are simultaneously generated in the same sub frame, terminal 200 (control section 208) does not transmit (drops) information related to the response signal for some downlink unit bands (information related to the response signal of downlink unit band 3 in FIG. 13B). That is, only when the SR and the response signal are simultaneously generated in the same sub frame, terminal 200 bundles ACK for some downlink unit bands into NACK. Here, since terminal 200 drops the response signal for the downlink unit band having a low priority among a plurality of downlink unit bands set to terminal 200, the dropping of some response signals does not much affect retransmission efficiency. Thus, in the above described way, the overhead of the uplink control channel (PUCCH) can be reduced without lowering retransmission efficiency.

Mapping Example 2

Figure 14A:
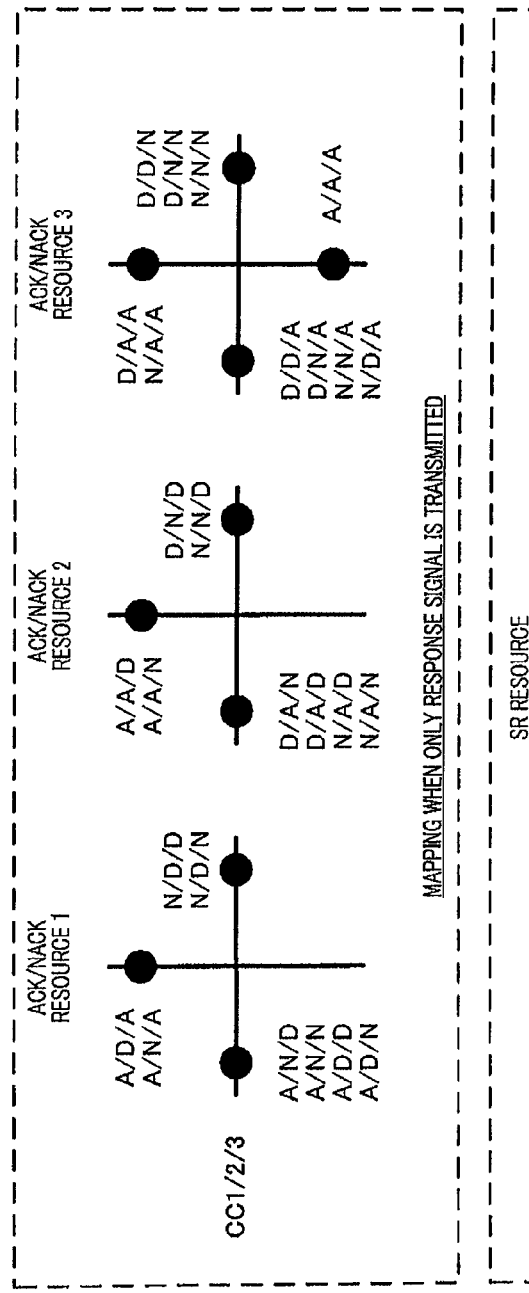
FIGS. 14A and 14B are diagrams for describing mapping of a response signal in an ACK/NACK resource and an SR resource according to Embodiment 2 of the present invention (mapping example 2)
Figure 14B:
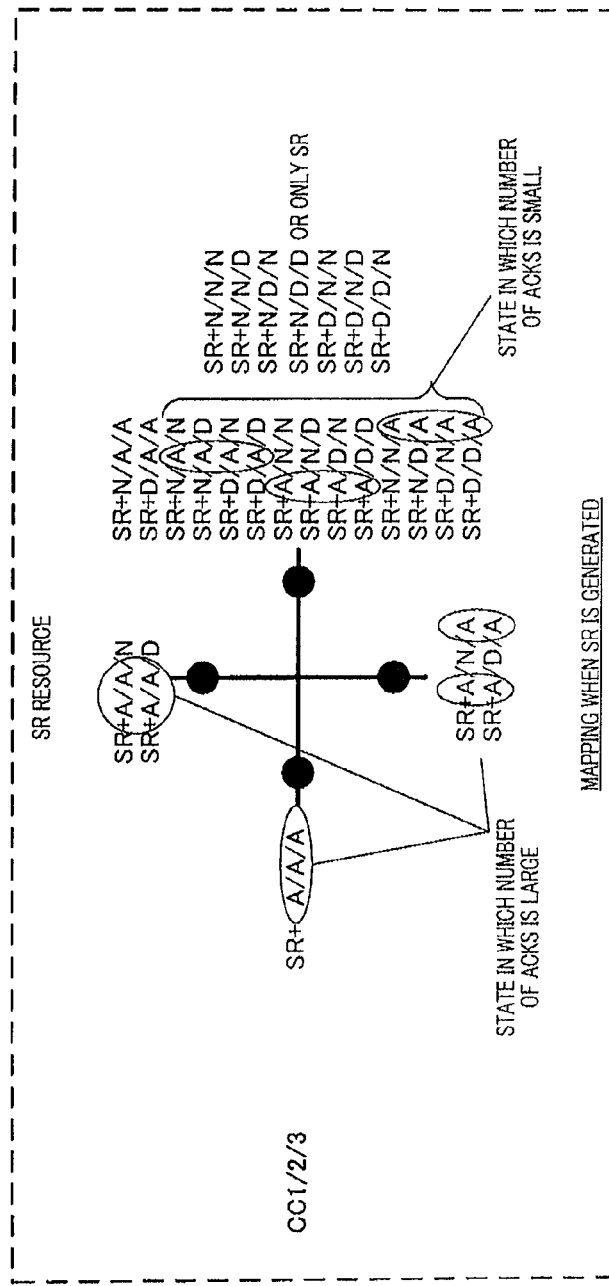

FIGS. 14A and 14B

In mapping example 2, when the SR and the response signal are simultaneously transmitted ("when SR and response signal are transmitted" illustrated in FIG. 12C), terminal 200 bundles states in which the number of ACKs among reception success/failure (error detection result) pattern candidates (states) is small, and the terminal 200 maps a bundling result to the same phase point as the SR resource. That is, when the SR and the response signal are simultaneously transmitted, terminal 200 bundles reception success/failure (error detection result) pattern candidates (states) which are relatively low in probability of occurrence, and maps a bundling result to the same phase point as the SR resource.

Generally, base station 100 performs adaptive modulation so that an error rate (block error rate) of downlink data can range from about 10% to about 30%. For this reason, a probability that terminal 200 will generate ACK as an error detection result on certain downlink data is higher than a probability that terminal 200 will generate NACK. That is, a reception success/failure (error detection result) pattern (state) which is large in the number of ACKs is in a state in which a probability of occurrence is relatively high, and a reception success/failure (error detection result) pattern (state) which is small in the number of ACKs is in a state in which a probability of occurrence is relatively low.

In this regard, when the SR and the response signal have been simultaneously generated ("when SR and response signal are transmitted" illustrated in FIG. 12C), terminal 200 transmits a state in which the number of ACKs is one (a state in which the number of ACKs is small) using the same phase point (the phase point (1, 0) of the SR resource in FIG. 14B) as a state in which all is NACK (or DTX). That is, in FIG. 14B, terminal 200 bundles a state in which the number of ACKs is one (a state in which the number of ACKs is small) into a state in which all is NACK (or DTX).

On the other hand, terminal 200 notifies states in which the number of ACKs is 2 or 3 (a state in which the number of ACKs is large) using different phase points in the SR resource as illustrated in FIG. 14B. Here, in order to suppress the number of SR resources to one, some states ("N/A/A" and "D/A/A") among states in which the number of ACKs is 2 are also bundled into a state in which all is NACK (or DTX) as illustrated in FIG. 14B. Here, similarly to mapping example 1, priorities, among downlink unit bands 1 to 3, which base station 100 uses to transmit downlink data, are set to be higher in ascending order of downlink unit bands 1, 2, and 3. In this case, a state ("N (or D)/A/A") in which the response signals for downlink unit bands 2 and 3 are ACK is lower in probability of occurrence than other states ("A/A/N(or D)" and "A/N(or D)/A") in which the number of ACKs is 2. That is, in FIG. 14B, in order to suppress the number of SR resources to one, some states ("N/A/A" and "D/A/A"), which are low in probability of occurrence, among states in which the number of ACKs is 2 are also bundled into a state in which all is NACK (or DTX).

Thus, a state in which the number of ACKs is 1 (and some of states in which the number of ACKs is 2) is not actually notified from terminal 200 to base station 100. That is, downlink data, which has been transmitted from base station 100 to terminal 200 using a downlink unit band whose response signal is ACK in a state in which the number of ACKs is 1 (and some of states in which the number of ACKs is 2), is necessarily retransmitted.

However, it is rare for terminal 200 side to simultaneously generate the SR and the response signal in the same sub frame, similarly to mapping example 1. Further, as described above, a possibility that ACK will be generated for certain downlink data is higher than a possibility that NACK will be generated. When these are taken into consideration, even though a state in which the number of ACKs is 1 (and some of states in which the number of ACKs is 2), that is, a state in which a probability of occurrence is low, is bundled into a state in which all is NACK (or DTX), retransmission efficiency is hardly affected.

Further, in mapping example 2, when terminal 200 transmits only the response signal ("when only response signal is transmitted" illustrated in FIG. 12B), it is similar to Embodiment 1 (FIG. 11A) as illustrated in FIG. 14A. Further, when terminal 200 transmits only the SR ("when only SR is transmitted" illustrated in FIG. 12D), terminal 200 transmits the SR using the same phase point (1, 0) as in the state in which all is NACK (or DTX) (and some of states in which the number of ACKs is 2), as illustrated in FIG. 14B.

In the above-described way, in mapping example 2, only when the SR and the response signal have been simultaneously generated in the same sub frame, terminal 200 (control section 208) does not transmit ACK for some downlink unit bands. Specifically, terminal 200 (control section 208) bundles a state in which the number of ACKs is small (the state in which the number of ACKs is 1 in FIG. 14B) into a state in which all is NACK (or DTX). Here, since the state in which the number of ACKs is small is lower in probability of occurrence than the state in which the number of ACKs is large, even though the state in which the number of ACKs is small is bundled into the state in which all is NACK (DTX), retransmission efficiency is not much affected. Thus, in the above-described way, the overhead of the uplink control channel (PUCCH) can be reduced without lowering retransmission efficiency.

Mapping Example 3

FIGS. 15A and 15B

In mapping example 3, when the SR and the response signal are simultaneously transmitted ("when SR and response signal are transmitted" illustrated in FIG. 12C), among the reception success/failure (error detection result) pattern candidates (states), terminal 200 bundles a state including ACK for downlink data transmitted using a downlink unit band which is not important to terminal 200 into a state in which all is NACK (or DTX), and maps a bundling result to the same phase point of the same resource. That is, when the SR and the response signal are simultaneously transmitted, terminal 200 does not bundle a state including ACK for downlink data transmitted using a downlink unit band which is important to terminal 200 into NACK, and performs transmission using different phase points.

Here, examples of the downlink unit band which is important to terminal 200 include (1) a downlink unit band onto which broadcast information (BCH) to be received by terminal 200 has been mapped, (2) a downlink unit band received when terminal 200 is initially connected to base station 100, that is, before carrier aggregation communication starts, or (3) a downlink unit band which is explicitly notified from base station 100 to terminal 200 as an important carrier (anchor carrier). In the following description, it is assumed that downlink unit band 1 (CC1) is an important downlink unit band (for example, anchor carrier).

In this regard, when the SR and the response signal have been simultaneously generated ("when SR and response signal are transmitted" illustrated in FIG. 12C), terminal 200 bundles some ACKs for downlink unit bands 2 and 3 (unimportant downlink unit bands) other than important downlink unit band 1 into NACK. On the other hand, terminal 200 notifies ACK and NACK for downlink data transmitted by using important downlink unit band 1 (anchor carrier, CC1), using different phase points, as illustrated in FIG. 15B. That is, when the SR and the response signal have been simultaneously generated, terminal 200 decides a resource for transmitting the response signal and a phase point, based on only the reception status of downlink unit band 1 (CC1) independent of the reception statuses of downlink unit band 2 (CC2) and downlink unit band 3 (CC3) in terminal 200 as illustrated in FIG. 15B.

Thus, base station 100 can reliably decide which of ACK and NACK has been generated for downlink data transmitted using important downlink unit band 1 (anchor carrier) in terminal 200. Further, when only the response signal is transmitted ("when only response signal is transmitted" illustrated in FIG. 12B) as illustrated in FIG. 15A, base station 100 can decide the reception status by terminal 200 on all downlink unit bands, similarly to Embodiment 1 (FIG. 11A).

Meanwhile, when the SR and the response signal have been simultaneously generated, even though ACK has been generated in downlink unit bands 2 and 3, several situations in which base station 100 is difficult to decide ACK and NACK (states notified using the phase point (1, 0) illustrated in FIG. 15B) occur.

However, similarly to mapping example 1, it is rare for terminal 200 side to simultaneously generate the SR and the response signal in the same sub frame. Further, base station 100 transmits important information (for example, control information of a higher layer) using important downlink unit band 1 (anchor carrier). Thus, even when terminal 200 has simultaneously generated the SR and the response signal, base station 100 can reliably decide ACK and NACK for downlink unit band 1 (anchor carrier), and terminal 200 can receive important information with the small number of transmission times (the small number of retransmission times). When these are taken into consideration, even though it is difficult to normally notify base station 100 of information related to the response signal for unimportant downlink unit bands 2 and 3 depending on circumstances, influence on the whole system is small.

In mapping example 3, when terminal 200 transmits only the SR ("when only SR is transmitted" illustrated in FIG. 12D), terminal 200 transmits the SR using the same phase point (1, 0) as a state in which the reception status of downlink unit band 1 is NACK or DTX (that is, a state in which some ACKs of unimportant downlink unit bands 2 and 3 are bundled into NACK) as illustrated in FIG. 15B.

Thus, in mapping example 3, only when the SR and the response signal have been simultaneously generated in the same sub frame, terminal 200 (control section 208) does not transmit information related to some response signals for downlink unit bands (unimportant downlink unit bands) other than an important downlink unit band (anchor carrier). Specifically, terminal 200 bundles some ACKs for downlink unit bands (unimportant downlink unit bands) other than an important downlink unit band (anchor carrier) into NACK. Thus, when the SR and the response signal have been simultaneously generated in the same sub frame, terminal 200 preferentially notifies the response signal for the important downlink unit band (anchor carrier) among a plurality of downlink unit bands set to terminal 200. In the above described way, the overhead of the uplink control channel (PUCCH) can be reduced without adversely influencing the whole system.

Mapping Example 4

FIGS. 16A and 16B

In mapping example 4, when the SR and the response signal are simultaneously transmitted ("when SR and response signal are transmitted" illustrated in FIG. 12C), terminal 200 decides a resource onto which the response signal is mapped and a phase point even from among the ACK/NACK resource as well as the SR resource.

Specifically, in FIGS. 16A and 16B, when the SR and the response signal have been simultaneously generated ("when SR and response signal are transmitted" illustrated in FIG. 12C), a state in which the number of ACKs is large (here, a state in which the number of ACKs is 2 or more) is associated with a resource and a phase point which are different from other states, similarly to mapping example 2 (FIG. 14B). That is, respective states (reception success/failure (error detection result) patterns) are associated with resources and phase points of the response signal, so as to prevent a state in which the number of ACKs is large from being bundled into other states.

Further, in FIGS. 16A and 16B, when the SR and the response signal have been simultaneously generated ("when SR and response signal are transmitted" illustrated in FIG. 12C), ACK and NACK for an important downlink unit band (here, downlink unit band 1 (for example, anchor carrier)) are associated with different resources and different phase points, similarly to mapping example 3 (FIG. 15B). That is, respective states (reception success/failure (error detection result) patterns) are associated with resources and phase points of the response signal so as to prevent ACK for an important downlink unit band (here, downlink unit band 1 (for example, anchor carrier)) from being bundled into NACK.

At this time, the respective states (reception success/failure (error detection result) patterns) are grouped into 6 types of states (6 reception success/failure (error detection result) pattern candidate groups). Specifically, the respective states are grouped into 6 types of pattern candidate groups including "A/A/A", "A/A/N(D)", "A/N(D)/A", "A/N(D)/N(D)", "N(D)/A/A", and the other states, which are indicated by white circles "∘" illustrated in FIGS. 16A and 16B.

In this regard, when the SR and the response signal have been simultaneously generated ("when SR and response signal are transmitted" illustrated in FIG. 12C), terminal 200 transmits the response signal using phase points (0, −j) of ACK/NACK resources 1 and 2 which are not used when only the response signal is transmitted ("when only response signal is transmitted" illustrated in FIG. 12B) among ACK/NACK resources 1 and 2 illustrated in FIG. 16A in addition to 4 phase points of the SR resource illustrated in FIG. 16B. That is, terminal 200 transmits information related to the response signal using a total of 6 phase points including 4 phase points of the SR resource illustrated in FIG. 16B, and 2 phase points (0, −j) of ACK/NACK resources 1 and 2 illustrated in FIG. 16A. In the above-described way, when the SR and the response signal have been simultaneously generated ("when SR and response signal are transmitted" illustrated in FIG. 12C), even though there are 6 error detection result candidate pattern groups, since the phase point which is not used by the ACK/NACK resource is used, the number of SR resources necessary for transmitting the SR and the response signal can be suppressed to one.

That is, when the SR and the response signal have been simultaneously generated ("when SR and response signal are transmitted" illustrated in FIG. 12C), terminal 200 bundles only a state which is a state including ACK for unimportant downlink unit bands 2 and 3 and which is small in the number of ACKs (a state in which the number of ACKs is 1) into a state in which all is NACK (or DTX).

Thus, when the SR and the response signal have been simultaneously generated ("when SR and response signal are transmitted" illustrated in FIG. 12C), base station 100 can reliably decide a state in which the number of ACKs is large (here, a state in which the number of ACKs is 2 or more) similarly to mapping example 2, and can reliably decide the response signal for the important downlink unit band (for example, anchor carrier) similarly to mapping example 3.

Further, in mapping example 4, when terminal 200 transmits only the response signal ("when only response signal is transmitted" illustrated in FIG. 12B), it is similar to Embodiment 1 (FIG. 11A), as illustrated in FIG. 16A (black circles "•"). Further, when terminal 200 transmits only the SR ("when only SR is transmitted" illustrated in FIG. 12D), terminal 200 transmits the SR using the same phase point (1, 0) as in the state in which all is NACK (or DTX) (and the state including ACK dropped only when the SR is generated), as illustrated in FIG. 16B.

In the above-described way, in mapping example 4, when the SR and the response signal have been simultaneously generated in the same sub frame, terminal 200 associates information related to the response signal for some downlink unit bands with the phase point which is not used by the ACK/NACK resource. As a result, the number of error detection result pattern candidates which can be decided by the base station can be increased, without increasing the number of SR resources. That is, the number of ACKs dropped by terminal 200 (the number of ACKs bundled into NACK) can be reduced. That is, influence on retransmission efficiency caused by the dropping of the response signal at terminal 200 side can be further reduced compared to mapping examples 2 and 3. In the above-described way, the overhead of the uplink control channel (PUCCH) can be reduced without lowering retransmission efficiency.

The mapping examples of the response signal in terminal 200 have been described above.

In the above-described way, according to the present embodiment, by dropping ACK information in some downlink unit bands at terminal 200, the overhead of the uplink control channel (PUCCH) can be further reduced compared to Embodiment 1.

The embodiments of the present invention have been described above.

Figure 17A:
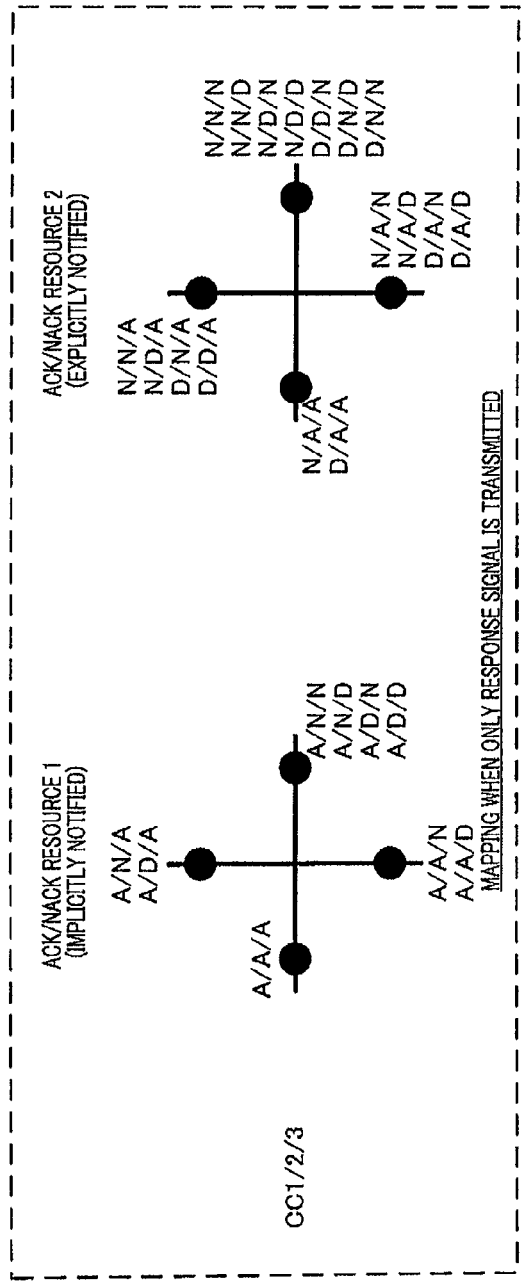
FIGS. 17A and 17B are diagrams illustrating a variation of the present invention.
Figure 17B:
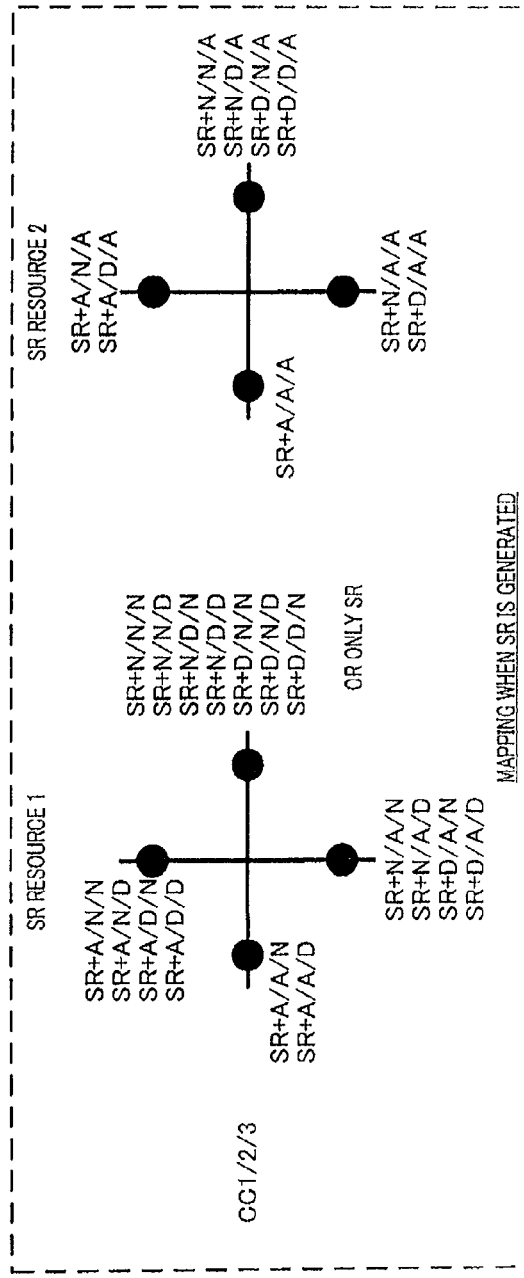

The above embodiments have been described in connection with an example in which all ACK/NACK resources are notified in association with CCEs occupied by the downlink assignment control information for the terminal (that is, implicitly), however, the present invention is not limited thereto. For example, the mapping rule of the response signal in FIG. 11A may be applied to the case in which some ACK/NACK resources are explicitly notified from the base station, as illustrated in FIGS. 17A and 17B. FIG. 17B is identical to FIG. 11B. However, in FIG. 17A, since ACK/NACK resource 2 is explicitly notified, the terminal side already knows information of ACK/NACK resource 2 regardless of whether or not the terminal has successfully received the downlink assignment control information. Thus, the terminal can map the state such as "N/D/A" or "D/D/A" (that is, the state in which DTX has been generated for downlink unit band 2) to ACK/NACK resource 2. That is, even when three downlink unit bands are set to the terminal, the number of ACK/NACK resources necessary for transmitting only the response signal at the terminal can be reduced to two, compared to FIG. 11A (three ACK/NACK resources).

The above embodiments have been described in connection with the example in which the ZAC sequence is used for primary spreading in the PUCCH resource, and the Walsh sequence and the DFT sequence are used for secondary spreading as OC indices. However, in the present invention, non-ZAC sequences which are mutually separable by different cyclic shift indices may be used for primary-spreading. For example, a generalized chirp like (GCL) sequence, a constant amplitude zero auto correlation (CAZAC) sequence, a Zadoff-Chu (ZC) sequence, a pseudo-noise (PN) sequence such as an M sequence or an orthogonal gold code sequence, a sequence which is randomly generated by a computer and has a steep auto-correlation characteristic on the time axis, or the like may be used for primary-spreading. The ZAC sequence may be expressed as "base sequence" in English, which means a base sequence for giving a cyclic shift. Further, sequences orthogonal to each other or any sequences which are recognized as being substantially orthogonal to each other may be used as OC indices for secondary-spreading. In the above description, a resource of a response signal (for example, a PUCCH resource) is defined by a cyclic shift index of a ZAC sequence and a sequence number of an OC index.

Further, the above embodiments have been described in connection with the example in which secondary spreading is performed after primary spreading, as an order of processing at the terminal side. However, an order of processing of primary spreading and secondary spreading is not limited thereto. That is, since both primary spreading and secondary spreading are the processing represented by multiplication, for example, even when primary spreading is performed on the response signal after secondary spreading, the same effect as in the present embodiment is obtained.

Further, the above embodiments have been described in connection with the example in which control section 101 of base station 100 performs control such that downlink data and downlink assignment control information for the downlink data are mapped to the same downlink unit band, however, the present embodiment is not limited thereto. That is, even when downlink data and downlink assignment control information for the downlink data are mapped to separate downlink unit bands, the present embodiment can be applied as long as a correspondence relation between the downlink assignment control information and the downlink data is clear. In this case, the terminal side obtains ACK/NACK resource 1 as a PUCCH resource corresponding to "a resource (CCE) occupied by downlink assignment control information for downlink data transmitted through downlink unit band 1."

Further, the above embodiments have been described in connection with the example in which the response signal transmitted by the terminal is modulated using a quadrature phase shift keying (QPSK) scheme. However, the present invention is not limited to the case in which the response signal is modulated using the QPSK scheme and can be applied, for example, even when the response signal is modulated using the BPSK scheme or a 16 quadrature amplitude modulation (QAM).

Further, the above embodiments have been described in connection with the example in which the present invention is implemented in hardware, however, the present invention may be implemented in software.

The functional blocks used for description of the above embodiments are typically implemented as large scale integration (LSI) which is an integrated circuit (IC). The functional blocks may be individually implemented as one chip, or some or all of the functional blocks may be implemented as one chip. Here, "LSI" is adopted here but this may also be referred to as "IC," "system LSI," "super LSI" or "ultra LSI" depending on a difference in integration.

A circuit integration technique is not limited to the LSI, and implementation by a dedicated circuit or a universal processor may be adopted. After LSI manufacture, a field programmable gate array (FPGA) which is programmable or a reconfigurable processor in which connections and settings of circuit cells within an LSI can be reconfigured may be used.

Further, if a circuit integration technique of replacing the LSI by another technique advanced or derived from a semiconductor technology appears, the functional blocks may be integrated using the technique. There may be a possibility that a biotechnology will be applied.

The disclosure of Japanese Patent Application No. 2009-230727, filed on Oct. 2, 2009, including the specification, drawings and abstract, is incorporated herein by reference in its entirety.

INDUSTRIAL APPLICABILITY

A terminal apparatus and a retransmission method according to the present invention are useful in simultaneously transmitting an SR and a response signal while suppressing an increase in the overhead of an uplink control channel, when channel selection is applied as a method of transmitting a response signal when carrier aggregation communication is performed using a plurality of downlink unit bands.

REFERENCE SIGNS LIST

100 Base station
101 Control section
102 Control information generating section
103, 105 Coding section
104, 107, 213 Modulating section
106 Data transmission control section
108 Mapping section
109, 216 IFFT section
110, 217 CP adding section
111, 218 Radio transmitting section
112, 201 Radio receiving section
113, 202 CP removing section
114 PUCCH extracting section
115 Despreading section
116 Sequence control section
117 Correlation processing section
118 Deciding section
119 Retransmission control signal generating section
200 Terminal
203 FFT section
204 Extracting section
205, 209 Demodulating section
206, 210 Decoding section
207 Deciding section
208 Control section
211 CRC section
212 Response signal generating section
214 Primary spreading section
215 Secondary spreading section

The invention claimed is:

1. An integrated circuit to control a process, the process comprising:
   transmitting, to a terminal configured with one or more downlink component carriers, downlink assignment information indicating resources for downlink data, wherein the resources are respectively assigned to the downlink component carriers;
   transmitting the downlink data to the terminal;
   receiving a response signal for the downlink data, the response signal being transmitted from the terminal; and
   receiving a scheduling request (SR) from the terminal, wherein:
   the response signal denotes an outcome of a decoding of the downlink data, or denotes a Discontinuous Transmission (DTX) representing that the outcome is not transmitted;
   when a plurality of downlink component carriers are configured, response signals for a plurality of downlink data in the downlink component carriers, respectively, are transmitted;
   when the response signals are transmitted, the response signals are transmitted using a phase point and one of uplink control channel resources for the response signals, which depend on an outcome of the decoding of the plurality of downlink data; and
   when both the response signals and the SR are transmitted in a same sub-frame, the response signals are transmitted using a phase point that depends on an outcome of the decoding of the plurality of downlink data and using an uplink control channel resource for the SR.

2. The integrated circuit according to claim 1, comprising:
   circuitry which, in operation, controls the process;
   at least one input coupled to the circuitry, wherein the at least one input, in operation, inputs the response signal; and
   at least one output coupled to the circuitry, wherein the at least one output, in operation, outputs the downlink assignment information.

3. The integrated circuit according to claim 2, wherein when both the response signals and the SR are transmitted in the same sub-frame, a same phase point is used for the response signals that respectively denote an unsuccessful outcome of the decoding or the DTX.

4. The integrated circuit according to claim 2, wherein when both the response signals and the SR are transmitted in the same sub-frame, a same phase point is used for different combinations of the response signals, wherein the different combinations share a same number of one or more response signals that denote a successful outcome of the decoding and also share a same downlink component carrier in which the downlink data is successfully decoded.

5. The integrated circuit according to claim 2, wherein when both the response signals and the SR are transmitted in the same sub-frame, at least some of the response signals are bundled into one response signal.

6. The integrated circuit according to claim 2, wherein when both the response signals and the SR are transmitted in the same sub-frame, the phase point used for the response signals that respectively denote an unsuccessful outcome of the decoding or the DTX is the same as the phase point used for the response signals, one of which denotes a successful outcome of the decoding.

7. The integrated circuit according to claim 2, wherein the transmitting includes transmitting the downlink assignment information on a control channel element (CCE), and an index of the uplink control channel resource for the response signal is associated with a CCE number.

8. The integrated circuit according to claim 2, wherein the transmitting includes transmitting the downlink assignment information on a control channel element (CCE), an index of the uplink control channel resource for the response signal is associated with a CCE number, and the process further comprises signaling an index of the uplink control channel resource for the SR.

9. The integrated circuit according to claim 2, wherein the transmitting includes transmitting the downlink assignment information on a control channel element (CCE), an index of the uplink control channel resource for the response signal is associated with a CCE number, and an index of the uplink control channel resource for the SR is configured by a higher layer.

10. The integrated circuit according to claim 2, wherein the outcome of the decoding is denoted by an Acknowledgement (ACK) or a Negative Acknowledgment (NACK).

11. The integrated circuit according to claim 2, wherein the DTX represents that the downlink assignment information for the downlink data is not detected at the terminal.

12. The integrated circuit according to claim 2, wherein the phase point is a phase point in a binary phase shift keying (BPSK) modulation or in a quadrature phase shift keying (QPSK) modulation.

13. The integrated circuit according to claim 2, wherein a combination of outcomes of the decoding of the plurality of downlink data is associated with the phase point and an index of the uplink control channel resource for the response signal.

14. The integrated circuit according to claim 13, wherein different combinations are respectively associated with different phase points and different resource indexes of the uplink control channel resources for the response signal.

15. The integrated circuit according to claim 2, wherein the at least one output and the at least one input, in operation, are coupled to an antenna.

16. An integrated circuit comprising circuitry, which, in operation:
    controls transmission of downlink assignment information and downlink data to a terminal configured with one or more downlink component carriers, wherein the downlink assignment information indicates resources for the downlink data and the resources are respectively assigned to the downlink component carriers; and
    controls reception of a response signal and a scheduling request (SR) from the terminal, wherein the response signal is for the downlink data,
    wherein:
    the response signal denotes an outcome of a decoding of the downlink data, or denotes a Discontinuous Transmission (DTX) representing that the outcome is not transmitted;
    when a plurality of downlink component carriers are configured, response signals for a plurality of downlink data in the downlink component carriers, respectively, are transmitted;
    when the response signals are transmitted, the response signals are transmitted using a phase point and one of uplink control channel resources for the response signals, which depend on an outcome of the decoding of the plurality of downlink data; and
    when both the response signals and the SR are transmitted in a same sub-frame, the response signals are transmitted using a phase point that depends on an outcome of the decoding of the plurality of downlink data and using an uplink control channel resource for the SR.

17. The integrated circuit according to claim 16, comprising:
at least one input coupled to the circuitry, wherein the at least one input, in operation, inputs the response signal; and
at least one output coupled to the circuitry, wherein the at least one output, in operation, outputs the downlink assignment information.

18. The integrated circuit according to claim 17, wherein when both the response signals and the SR are transmitted in the same sub-frame, a same phase point is used for the response signals that respectively denote an unsuccessful outcome of the decoding or the DTX.

19. The integrated circuit according to claim 17, wherein when both the response signals and the SR are transmitted in the same sub-frame, a same phase point is used for different combinations of the response signals, wherein the different combinations share a same number of one or more response signals that denote a successful outcome of the decoding and also share a same downlink component carrier in which the downlink data is successfully decoded.

20. The integrated circuit according to claim 17, wherein when both the response signals and the SR are transmitted in the same sub-frame, at least some of the response signals are bundled into one response signal.

21. The integrated circuit according to claim 17, wherein when both the response signals and the SR are transmitted in the same sub-frame, the phase point used for the response signals that respectively denote an unsuccessful outcome of the decoding or the DTX is the same as the phase point used for the response signals, one of which denotes a successful outcome of the decoding.

22. The integrated circuit according to claim 17, wherein the transmission includes transmission of the downlink assignment information on a control channel element (CCE), and an index of the uplink control channel resource for the response signal is associated with a CCE number.

23. The integrated circuit according to claim 17, wherein the transmission includes transmission of the downlink assignment information on a control channel element (CCE), an index of the uplink control channel resource for the response signal is associated with a CCE number, and the circuitry, in operation, controls signaling of an index of the uplink control channel resource for the SR.

24. The integrated circuit according to claim 17, wherein the transmission includes transmission of the downlink assignment information on a control channel element (CCE), an index of the uplink control channel resource for the response signal is associated with a CCE number, and an index of the uplink control channel resource for the SR is configured by a higher layer.

25. The integrated circuit according to claim 17, wherein the outcome of the decoding is denoted by an Acknowledgement (ACK) or a Negative Acknowledgment (NACK).

26. The integrated circuit according to claim 17, wherein the DTX represents that the downlink assignment information for the downlink data is not detected at the terminal.

27. The integrated circuit according to claim 17, wherein the phase point is a phase point in a binary phase shift keying (BPSK) modulation or in a quadrature phase shift keying (QPSK) modulation.

28. The integrated circuit according to claim 17, wherein a combination of outcomes of the decoding of the plurality of downlink data is associated with the phase point and an index of the uplink control channel resource for the response signal.

29. The integrated circuit according to claim 28, wherein different combinations are respectively associated with different phase points and different resource indexes of the uplink control channel resources for the response signal.

30. The integrated circuit according to claim 17, wherein the at least one output and the at least one input, in operation, are coupled to an antenna.

* * * * *

UNITED STATES PATENT AND TRADEMARK OFFICE
CERTIFICATE OF CORRECTION

PATENT NO.       : 9,504,063 B2
APPLICATION NO.  : 15/040855
DATED            : November 22, 2016
INVENTOR(S)      : Seigo Nakao et al.

It is certified that error appears in the above-identified patent and that said Letters Patent is hereby corrected as shown below:

On the Title Page

Item (56):
"3GPP TS 36.211 V8/.0, "3rd Generation Partnership Project; Technical Specification Group Radio Access Network; Evolved Universal Terrestrial Radio Access (E-UTRA); Physical Channels and Modulation (Release 8)," May 2009, 83 pages." should read, --3GPP TS 36.211 V8.7.0, "3rd Generation Partnership Project; Technical Specification Group Radio Access Network; Evolved Universal Terrestrial Radio Access (E-UTRA); Physical Channels and Modulation (Release 8)," May 2009, 83 pages.--.

Item (56):
"3GPP TS 36.211 V8/.0, "3GPP TS 36.212 V8/.0, "3rd Generation Partnership Project; Technical Specification Group Radio Access Network; Evolved Universal Terrestrial Radio Access (E-UTRA); Multiplexing and channel coding (Release 8)," May 2009, 60 pages." should read, --3GPP TS 36.212 V8.7.0, "3rd Generation Partnership Project; Technical Specification Group Radio Access Network; Evolved Universal Terrestrial Radio Access (E-UTRA); Multiplexing and channel coding (Release 8)," May 2009, 60 pages.--.

Signed and Sealed this
Seventh Day of February, 2017

Michelle K. Lee
*Director of the United States Patent and Trademark Office*